US010055975B2

(12) United States Patent
Aoyama et al.

(10) Patent No.: US 10,055,975 B2
(45) Date of Patent: Aug. 21, 2018

(54) CIRCUIT DEVICE, PHYSICAL QUANTITY DETECTION DEVICE, ELECTRONIC APPARATUS, AND MOVING OBJECT

(71) Applicant: Seiko Epson Corporation, Tokyo (JP)

(72) Inventors: Takashi Aoyama, Chino (JP); Kentaro Seo, Minowa (JP)

(73) Assignee: Seiko Epson Corporation (JP)

( * ) Notice: Subject to any disclaimer, the term of this patent is extended or adjusted under 35 U.S.C. 154(b) by 298 days.

(21) Appl. No.: 15/143,849

(22) Filed: May 2, 2016

(65) Prior Publication Data

US 2016/0335885 A1   Nov. 17, 2016

(30) Foreign Application Priority Data

May 14, 2015   (JP) ................. 2015-098792

(51) Int. Cl.
G08C 15/06   (2006.01)
G08C 25/00   (2006.01)
H04J 3/14    (2006.01)
H04J 3/06    (2006.01)

(52) U.S. Cl.
CPC ............. *G08C 15/06* (2013.01); *G08C 25/00* (2013.01); *H04J 3/0658* (2013.01); *H04J 3/14* (2013.01); *G08C 2200/00* (2013.01)

(58) Field of Classification Search
None
See application file for complete search history.

(56) References Cited

U.S. PATENT DOCUMENTS

| 6,912,901 | B1* | 7/2005 | Nozoe | G01C 19/5607 73/1.77 |
|---|---|---|---|---|
| 8,375,789 | B2* | 2/2013 | Prandi | G01C 19/5726 73/504.04 |
| 8,792,011 | B2* | 7/2014 | Washisu | G03B 5/00 348/208.2 |
| 9,869,986 | B2* | 1/2018 | Haneda | G05B 19/0423 |
| 2010/0326189 | A1* | 12/2010 | Sato | G01C 19/56 73/504.12 |
| 2012/0055230 | A1 | 3/2012 | Naruse et al. | |
| 2013/0055810 | A1* | 3/2013 | Yanagisawa | G01C 19/56 73/504.12 |
| 2013/0055815 | A1* | 3/2013 | Yanagisawa | G01C 19/5649 73/579 |

FOREIGN PATENT DOCUMENTS

| JP | 2010-286368 A | 12/2010 |
|---|---|---|
| JP | 2012-058010 A | 3/2012 |
| JP | 2014-197010 A | 10/2014 |

* cited by examiner

*Primary Examiner* — Steve R Young
(74) *Attorney, Agent, or Firm* — Harness, Dickey & Pierce, P.L.C.

(57) ABSTRACT

A circuit device includes a synchronization detection circuit which performs synchronization detection of a physical quantity signal of an input signal and outputs the physical quantity signal, and a filter unit. The synchronization detection circuit includes first and second detection circuits, and the filter unit includes first and second filters. In a first mode, the physical quantity signal from the first detection circuit is input to the first filter, and the undesired signal from the second detection circuit is input to the second filter. In a second mode, the physical quantity signal from the first detection circuit is input to the first filter and the second filter.

20 Claims, 13 Drawing Sheets

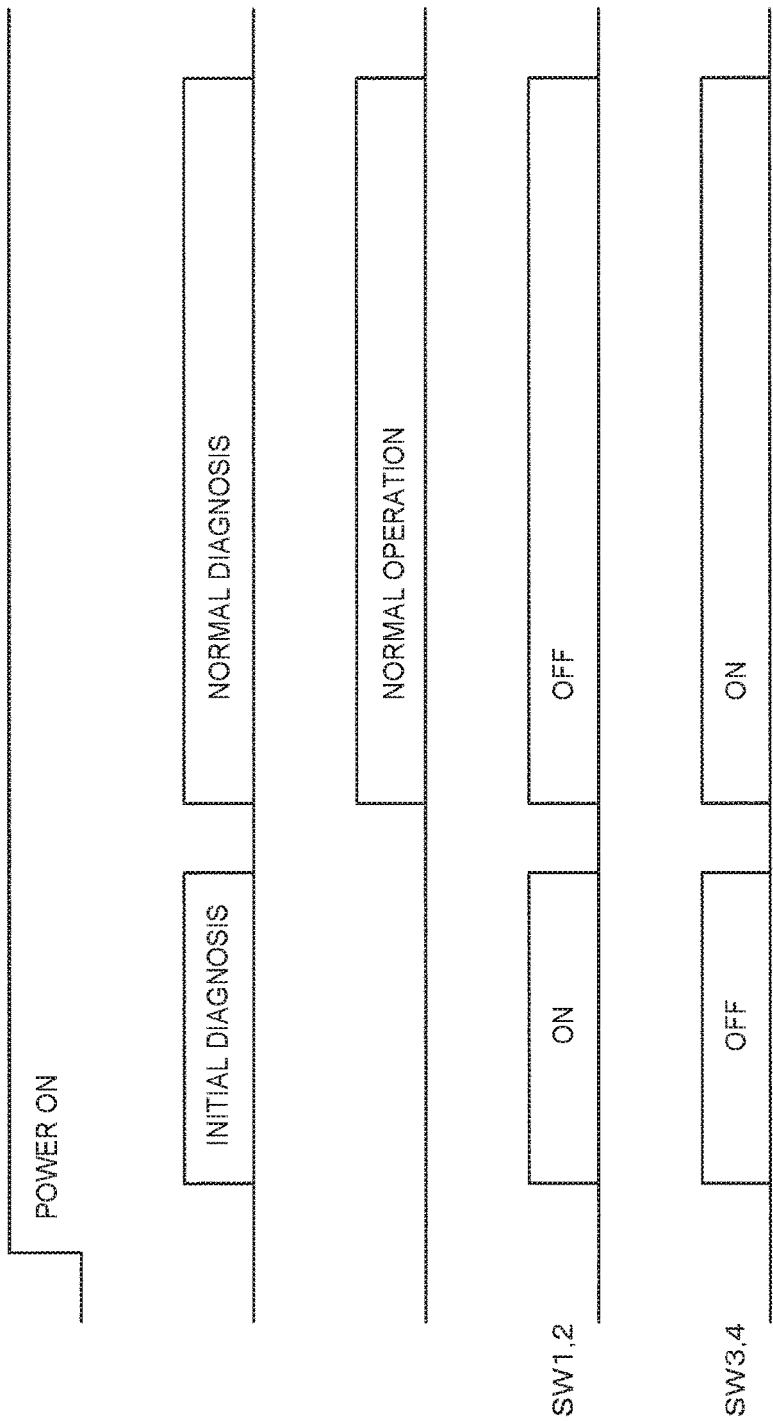

CIRCUIT DEVICE, PHYSICAL QUANTITY DETECTION DEVICE, ELECTRONIC APPARATUS, AND MOVING OBJECT

BACKGROUND

1. Technical Field

The present invention relates to a circuit device, a physical quantity detection device, an electronic apparatus, and a moving object.

2. Related Art

In general, a circuit device is known which detects physical quantity based on a detection signal from a physical quantity transducer. For example, a gyro sensor includes a circuit device which detects angular velocity or the like as physical quantity. The gyro sensor is equipped in, for example, an electronic apparatus, such as a digital camera or a smart phone, or a moving object such as a vehicle or an airplane. The gyro sensor performs camera shake correction, posture control, assisted GPS navigation, or the like, using physical quantity such as detected angular velocity.

The related art of the circuit device of the gyro sensor is disclosed in JP-A-2014-197010 and JP-A-2012-058010. JP-A-2014-197010 and JP-A-2012-058010 provide two detection circuits such as a detection circuit for a physical quantity signal and a detection circuit for an undesired signal, as a synchronization detection circuit. In addition, the detection circuit for an undesired signal is used for failure detection of the circuit device.

However, in the related art of JP-A-2014-197010 and JP-A-2012-058010, an output signal of the detection circuit for a physical quantity signal changes to an arbitrary signal level. Hence, there is a problem in which it is difficult to detect failure of a circuit provided in a path which passes through the detection circuit, even if the output signal of the detection circuit for a physical quantity signal is used. For example, in a case where a filter unit is provided on a rear stage side of a synchronization detection circuit, it is difficult to detect failure of the filter unit.

SUMMARY

An advantage of some aspects of the invention is to provide a circuit device, a physical quantity detection device, an electronic apparatus, and a moving object which can perform more appropriate failure detection.

The invention can be implemented as the following aspects or embodiments.

An aspect of the invention relates to a circuit device including: a synchronization detection circuit which receives an input signal including a physical quantity signal and an undesired signal, performs synchronization detection of the physical quantity signal from the input signal, and outputs the physical quantity signal; and a filter unit which is provided on a rear stage side of the synchronization detection circuit. The synchronization detection circuit includes a first detection circuit which receives the input signal; and a second detection circuit which receives the input signal. The filter unit includes a first filter; and a second filter. The first detection circuit performs synchronization detection of the physical quantity signal from the input signal based on a first clock signal and outputs the physical quantity signal. The second detection circuit performs synchronization detection of the undesired signal from the input signal based on a second clock signal having a phase different from a phase of the first clock signal and outputs the undesired signal. In a first mode, the physical quantity signal from the first detection circuit is input to the first filter, and the undesired signal from the second detection circuit is input to the second filter. In a second mode, the physical quantity signal from the first detection circuit is input to the first filter and the second filter.

According to the aspect of the invention, the synchronization detection circuit includes the first and second detection circuits, the first detection circuit performs synchronization detection of the physical quantity signal and outputs the physical quantity signal, and the second detection circuit performs synchronization detection of the undesired signal and outputs the undesired signal. In addition, the filter unit is provided on the rear stage side of the synchronization detection circuit, and the filter unit includes the first and second filters. In addition, in the first mode, the physical quantity signal from the first detection circuit is input to the first filter, and the undesired signal for failure detection from the second detection circuit is input to the second filter. In the second mode, the physical quantity signal from the first detection circuit is input to the first filter and the second filter. Hence, by performing, for example, determination of coincidence or non-coincidence of signal levels of output signals of the first and second detection circuits, or the like, it is possible to detect failure of the first and second filters. Thus, it is possible to perform more appropriate failure detection, and to increase reliability or the like.

In the circuit device according to the aspect of the invention, a signal selection circuit which is provided between the synchronization detection circuit and the filter unit may be further included. In the first mode, the signal selection circuit may output the physical quantity signal from the first detection circuit to the first filter, and output the undesired signal from the second detection circuit to the second filter. In the second mode, the signal selection circuit may output the physical quantity signal from the first detection circuit to the first filter and the second filter.

By providing the signal selection circuit, the physical quantity signal and the undesired signal from the first and second detection circuits can be respectively input to the first and second filters, in the first mode, and the physical quantity signal from the first detection circuit can be input to the first and second filters, in the second mode.

In the circuit device according to the aspect of the invention, a time period which is configured by a first time period that is set to the first mode and a second time period that is set to the second mode may be repeated during a normal diagnosis period after the circuit device starts.

With this configuration, it is possible to detect failure of the first and second filters of the filter unit or the like during the normal diagnosis period after the circuit device starts, and thus, it is possible to increase reliability or the like.

In the circuit device according to the aspect of the invention, in the first and second modes, the first detection circuit may perform synchronization detection of the physical quantity signal from the input signal based on the first clock signal and output the physical quantity signal, and the second detection circuit may perform synchronization detection of the undesired signal from the input signal based on the second clock signal and output the undesired signal. In third and fourth modes, the first detection circuit may perform synchronization detection of the undesired signal from the input signal based on the second clock signal and output the undesired signal, and the second detection circuit may perform synchronization detection of the physical quantity signal from the input signal based on the first clock signal and output the physical quantity signal. In the third mode, the undesired signal from the first detection circuit may be input to the second filter, and the physical quantity signal from the second detection circuit may be input to the first filter. In the fourth mode, the physical quantity signal from the second detection circuit may be input to the first filter and the second filter.

With this configuration, for example, the undesired signal for failure detection from the second detection circuit is output in the first and second modes, and thus, it is possible to detect failure of the second detection circuit or the like by performing failure determination based on the undesired signal. Meanwhile, the undesired signal for failure detection from the first detection circuit is output in the third and fourth modes, and thus, it is possible to detect failure of the first detection circuit or the like by performing failure determination based on the undesired signal. Hence, it is possible to perform more appropriate failure detection, and to increase reliability or the like.

In the circuit device according to the aspect of the invention, a signal selection circuit which is provided between the synchronization detection circuit and the filter unit may be further included. In the first mode, the signal selection circuit may output the physical quantity signal from the first detection circuit to the first filter and output the undesired signal from the second detection circuit to the second filter. In the second mode, the signal selection circuit may output the physical quantity signal from the first detection circuit to the first filter and the second filter. In the third mode, the signal selection circuit may output the undesired signal from the first detection circuit to the second filter and output the physical quantity signal from the second detection circuit to the first filter. In the fourth mode, the signal selection circuit may output the physical quantity signal from the second detection circuit to the first filter and the second filter.

By providing the signal selection circuit, the physical quantity signal and the undesired signal from the first and second detection circuits can be respectively input to the first and second filters, in the first mode, and the physical quantity signal from the first detection circuit can be input to the first and second filters, in the second mode. In addition, the undesired signal and the physical quantity signal from the first and second detection circuits can be respectively input to the second and first filters, in the third mode, and the physical quantity signal from the second detection circuit can be input to the first and second filters, in the fourth mode.

In the circuit device according to the aspect of the invention, the first detection circuit may receive a differential input signal which is configured by a positive input signal and a negative input signal as the input signal, and may output a first differential output signal which is configured by a first positive output signal and a first negative output signal. The second detection circuit may receive the differential input signal as the input signal, and may output a second differential output signal which is configured by a second positive output signal and a second negative output signal. In the first and second modes, the first detection circuit may output the physical quantity signal as the first differential output signal, and the second detection circuit may output the undesired signal as the second differential output signal. In the third and fourth modes, the first detection circuit may output the undesired signal as the first differential output signal, and the second detection circuit may output the physical quantity signal as the second differential output signal.

With this configuration, it is possible to perform more appropriate failure detection of the first and second detection circuits, the first and second filters, or the like, even in a case where the first and second detection circuits which receive differential signals and output differential signals are used.

In the circuit device according to the aspect of the invention, the first detection circuit may include a first switch element which is provided between a positive input node of the positive input signal that configures the differential input signal and a first positive output node of the first positive output signal that configures the first differential output signal, is turned on or off based on the first clock signal in the first and second modes, and is turned on or off based on the second clock signal in the third and fourth modes; a second switch element which is provided between a negative input node of the negative input signal that configures the differential input signal and a first negative output node of the first negative output signal that configures the first differential output signal, is turned on or off based on the first clock signal in the first and second modes, and is turned on or off based on the second clock signal in the third and fourth modes; a third switch element which is provided between the negative input node and the first positive output node, is turned on or off based on a first inverted clock signal that is an inverted signal of the first clock signal in the first and second modes, and is turned on or off based on a second inverted clock signal that is an inverted signal of the second clock signal in the third and fourth modes; and a fourth switch element which is provided between the positive input node and the first negative output node, is turned on or off based on the first inverted clock signal in the first and second modes, and is turned on or off based on the second inverted clock signal in the third and fourth modes. The second detection circuit may include a fifth switch element which is provided between the positive input node and a second positive output node of the second positive output signal that configures the second differential output signal, is turned on or off based on the second clock signal in the first and second modes, and is turned on or off based on the first clock signal in the third and fourth modes; a sixth switch element which is provided between the negative input node and a second negative output node of the second negative output signal that configures the second differential output signal, is turned on or off based on the second clock signal in the first and second modes, and is turned on or off based on the first clock signal in the third and fourth modes; a seventh switch element which is provided between the negative input node and the second positive output node, is turned on or off based on the second inverted clock signal in the first and second modes, and is turned on or off based on the first inverted clock signal in the third and fourth modes; and an eighth switch element which is provided between the positive input node and the second negative output node, is turned on or off based on the second inverted clock signal in the first and second modes, and is turned on or off based on the first inverted clock signal in the third and fourth modes.

With this configuration, it is possible to perform more appropriate failure detection of the first and second detection circuits, the first and second filters, or the like, even in a case where the detection circuit which receives differential signals and outputs differential signals uses the first and second detection circuits of a switching mixer type. In addition, by using the first and second detection circuits of a switching mixer type, it is also possible to perform synchronization detection with a low noise level.

In the circuit device according to the aspect of the invention, a time period which is configured by a first time period that is set to the first mode, a second time period that is set to the second mode, a third time period that is set to the third mode, and a fourth time period that is set to the fourth mode may be repeated during a normal diagnosis period after the circuit device starts.

With this configuration, it is possible to detect failure of the first and second detection circuits of the synchronization detection circuit, the first and second filters of the filter unit, or the like during the normal diagnosis period after the circuit device starts, and thus, it is possible to increase reliability or the like.

In the circuit device according to the aspect of the invention, an amplification circuit which is provided on a front stage side of the synchronization detection circuit, and an A/D conversion circuit which is provided on a rear stage side of the synchronization detection circuit may be further included.

With this configuration, a signal level of the input signal of the synchronization detection circuit can be amplified by the amplification circuit on the front stage side. A/D conversion of output signals of the first and second detection circuits can be performed by the A/D conversion circuit on the rear stage side. Hence, it is possible to perform various types of processing based on the physical quantity signal, failure detection determination based on the undesired signal, or the like, using the obtained A/D conversion values.

In the circuit device according to the aspect of the invention, a drive circuit which drives a physical quantity transducer, and a detection circuit which receives a detection signal according to physical quantity that is output from the physical quantity transducer and includes the synchronization detection circuit may be further included.

With this configuration, it is possible to perform failure detection of, for example, the synchronization detection circuit of the detection circuit, or the like, using the undesired signal which is arbitrarily generated by the physical quantity transducer.

Another aspect of the invention relates to a physical quantity detection device including: the circuit device described above; and the physical quantity transducer described.

Still another aspect of the invention relates to an electronic apparatus including: the circuit device described above.

Yet another aspect of the invention relates to a moving object including: the circuit device described above.

BRIEF DESCRIPTION OF THE DRAWINGS

The invention will be described with reference to the accompanying drawings, wherein like numbers reference like elements.

FIG. 12 is an operation sequence diagram illustrating an operation of the circuit device.

DESCRIPTION OF EXEMPLARY EMBODIMENTS

Hereinafter, preferred embodiments of the invention will be described in detail with reference to the accompanying drawings. The embodiments which will be described hereinafter are not intended to unduly limit the content of the invention described in the appended claims. In addition, none of the configurations which will be described hereinafter are limited as essential configuration requirements of the invention.

1. Circuit Device

Figure 1:
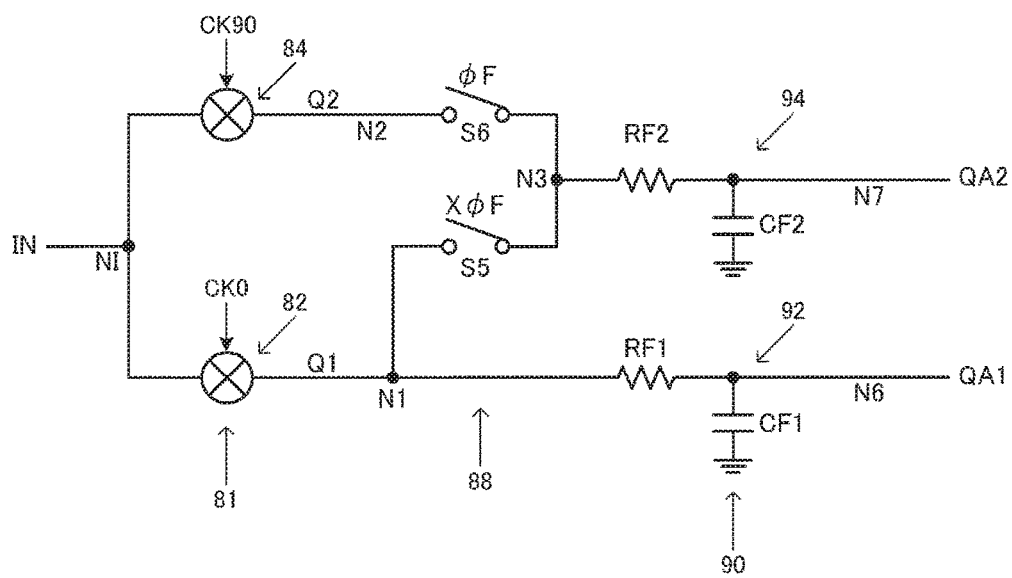
FIG. 1 is a configuration example of a circuit device according to an embodiment.

FIG. 1 illustrates a configuration example of a circuit device according to the present embodiment. As illustrated in FIG. 1, the circuit device according to the present embodiment includes a synchronization detection circuit 81 and a filter unit 90 which is provided in a rear stage side of the synchronization detection circuit 81. In addition, the circuit device can include a signal selection circuit 88 which is provided between the synchronization detection circuit 81 and the filter unit 90.

The synchronization detection circuit 81 receives an input signal IN including a physical quantity signal and an undesired signal, performs synchronization detection of the physical quantity signal or the like from the input signal IN, and outputs the physical quantity signal.

The filter unit 90 functions as a prefilter of an A/D conversion circuit 100 (refer to FIG. 6) which is provided on a rear stage side of, for example, the filter unit 90, or functions as a filter which attenuates the undesired signal that is not removed in the synchronization detection or the like.

The synchronization detection circuit 81 includes a first detection circuit 82 (first synchronization detection unit) to which the input signal IN is input, and a second detection circuit 84 (second synchronization detection unit) to which the input signal IN is input. The first and second detection circuits 82 and 84 perform synchronization detection based on a clock signal, and can be realized by a switching mixer or the like which is configured by multiple switching elements as an example.

Specifically, the first detection circuit 82 receives the input signal IN, and performs synchronization detection of the physical quantity signal from the input signal IN, based on a first clock signal CK0, and outputs the physical quantity signal. The second detection circuit 84 receives the input signal IN, performs synchronization detection of the undesired signal from the input signal IN, based on a second clock signal CK90 having a phase different from the first clock signal CK0, and outputs the undesired signal.

Here, if a gyro sensor is used as an example, the physical quantity signal is an angular velocity detection signal. However, the physical quantity signal may be a signal which detects other physical quantity such as, acceleration, velocity, or angular acceleration. The undesired signal is a leakage signal. Specifically, the undesired signal is, for example, a mechanical vibration leakage signal. The mechanical vibration leakage signal is, for example, an undesired signal which has a phase difference of 90 degrees with respect to the physical quantity signal that is a desired signal. In addition, the second clock signal CK90 is, for example, a signal whose phase difference is shifted by 90 degrees with respect to the first clock signal CK0. The input signal IN is a signal from, for example, an amplification circuit on a front stage side. The amplification circuit amplifies a signal according to physical quantity (angular velocity or the like) which is output from, for example, a physical quantity transducer, and outputs the amplified signal to the synchronization detection circuit 81 as the input signal IN.

For example, the first detection circuit 82 performs synchronization detection of the input signal IN based on the first clock signal CK0, and outputs the physical quantity signal such as an angular velocity signal. That is, the physical quantity signal (desired signal) having the same phase as the first clock signal CK0 is detected, and the undesired signal having a phase difference of 90 degrees with respect to the first clock signal CK0 is removed.

The second detection circuit 84 performs synchronization detection of the input signal IN based on the second clock signal CK90 whose phase is shifted by 90 degrees with respect to the first clock signal CK0, thereby performing synchronization detection of the undesired signal having a phase shifted by 90 degrees with respect to the physical quantity signal, and outputting the detected undesired signal. That is, the undesired signal having the same phase as the second clock signal CK90 is detected, and the physical quantity signal having a phase difference of 90 degrees with respect to the second clock signal CK90 is removed.

By performing A/D conversion of the undesired signal from the second detection circuit 84 using, for example, the A/D conversion circuit 100 (FIG. 6) in the rear stage, and analyzing the A/D converted value, failure detection can be performed. For example, as a leakage signal is arbitrarily generated in a physical quantity transducer (vibrating reed) and the second detection circuit 84 detects an input signal including the leakage signal, based on the second clock signal CK90, it is possible to perform failure detection (failure diagnosis) of the circuit device (detection circuit).

The filter unit 90 includes a first filter 92 and a second filter 94. In FIG. 1, the first filter 92 is a passive type low pass filter which is configured by a capacitor CF1 and a resistor RF1, and the second filter 94 is also a passive type low pass filter which is configured by a capacitor CF2 and a resistor RF2.

The filter unit 90 is not limited to the configuration of FIG. 1, and various modifications thereof can be made. For example, in FIG. 1, the filter unit 90 is configured by a first order filter (low pass filter), but may be configured by a second order filter (low pass filter) or higher. In addition, in FIG. 1, the filter unit 90 is configured by a passive type filter, but may be configured by an active type filter such as a switched capacitor filter (SCF).

Thus, in FIG. 1, in a first mode (in a case where an operation mode of the circuit device is set to the first mode), the physical quantity signal (output signal Q1, desired signal) from the first detection circuit 82 is input to the first filter 92, the undesired signal (output signal Q2) from the second detection circuit 84 is input to the second filter 94. Meanwhile, in a second mode (in a case where the operation mode of the circuit device is set to the second mode), the physical quantity signal Q1 from the first detection circuit 82 is input to the first filter 92 and the second filter 94.

For example, the signal selection circuit 88 is provided between the synchronization detection circuit 81 and the filter unit 90. Thus, the signal selection circuit 88 outputs the physical quantity signal from the first detection circuit 82 to the first filter 92, and outputs the undesired signal from the second detection circuit 84 to the second filter 94, in the first mode. Meanwhile, the physical quantity signal from the first detection circuit 82 is output to the first filter 92 and the second filter 94, in the second mode.

The signal selection circuit 88 includes switch elements S5 and S6. The switch elements S5 and S6 are realized by N type transistors or transfer gates.

The switch element S5 is provided between an output node N1 of the first detection circuit 82 and an input node N3 of the second filter 94. The switch element S6 is provided between an output node N2 of the second detection circuit 84 and the input node N3 of the second filter 94. The switch element S5 is turned on or off by a switch signal X$\phi$F, and the switch element S6 is turned on or off by a switch signal $\phi$F.

In a case where the operation mode of the circuit device is set to the first mode, the switch element S5 is turned off, and the switch element S6 is turned on. Accordingly, the physical quantity signal Q1 from the first detection circuit 82 is input to the first filter 92, and the undesired signal Q2 from the second detection circuit 84 is input to the second filter 94. As a result, filter processing (low pass filter processing) of the physical quantity signal is performed by the first filter 92, and filter processing (low pass filter processing) of the undesired signal is performed by the second filter 94. Then, output signals QA1 and QA2 whose filter processing is performed by the first and second filters 92 and 94 are output to the A/D conversion circuit 100 (FIG. 6) in the rear stage.

Meanwhile, in a case where the operation mode of the circuit device is set to the second mode, the switch element S5 is turned on, and the switch element S6 is turned off. Since the switch element S6 is turned off, the undesired signal Q2 from the second detection circuit 84 is not input to the second filter 94. Meanwhile, since the switch element S5 is turned on, the physical quantity signal Q1 from the first detection circuit 82 is input to both the first filter 92 and the second filter 94. Then, the output signals QA1 and QA2 whose filter processing is performed by the first and second filters 92 and 94 are output to the A/D conversion circuit 100 (FIG. 6) in the rear stage.

As described above, by operating the circuit device in the first and second modes, failure detection of the first and second filters 92 and 94 in the filter unit 90 can be performed.

Figure 2:
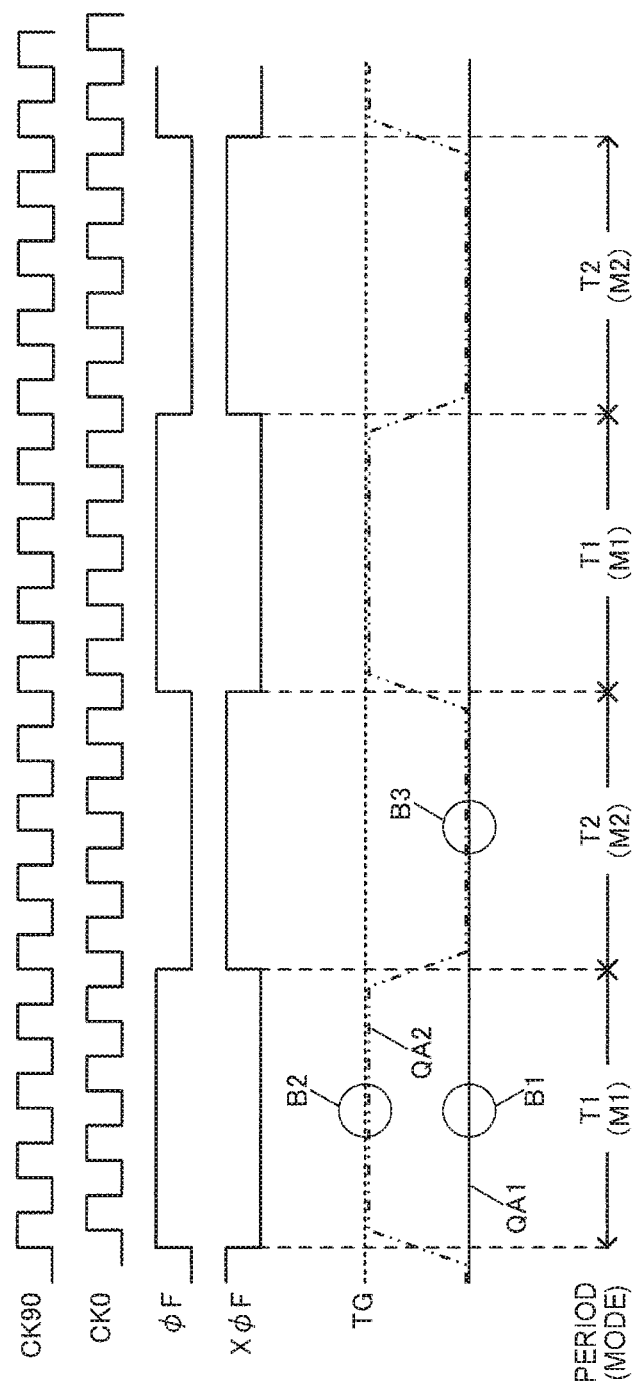
FIG. 2 is a signal waveform diagram illustrating an operation of the circuit device according to the present embodiment.

FIG. 2 is a signal waveform diagram illustrating the operation of the circuit device of FIG. 1. As illustrated in FIG. 2, if the switch signal $\phi$F has an H level and the switch signal X$\phi$F has an L level, the switch element S6 of FIG. 1 is turned on, the switch element S5 is turned off, and the operation mode of the circuit device is set to a first mode M1. Accordingly, the physical quantity signal Q1 from the first detection circuit 82 is input to the first filter 92, and the undesired signal Q2 from the second detection circuit 84 is input to the second filter 94 through the switch element S6 which is turned on.

Meanwhile, if the switch signal $\phi$F has an L level and the switch signal X$\phi$F has an H level, the switch element S6 is turned off, the switch element S5 is turned on, and the operation mode of the circuit device is set to a second mode M2. Accordingly, the undesired signal Q2 from the second detection circuit 84 is not input to the second filter 94, because the switch element S6 is turned off. In addition, the physical quantity signal Q1 from the first detection circuit 82 is input to the first filter 92, and is also input to the second filter 94 through the switch element S5 which is turned on.

In FIG. 2, a time period in which the switch signal ϕF has an H level and the operation mode is set to the first mode M1 becomes a first time period T1. In addition, a time period in which the switch signal XϕF has an H level and the operation mode is set to the second mode M2 becomes a second time period T2.

In the present embodiment, as illustrated in FIG. 2, the time period which is configured by the first time period T1 in which the operation mode is set to the first mode M1, and the second time period T2 in which the operation mode is set to the second mode M2 is repeated. For example, a time period which is configured by the first time period T1 and the second time period T2 are repeated such that the second time period T2 starts after the first time period T1, the first time period T1 starts after the second time period T2, the second time period T2 starts after the first time period T1, and the first time period T1 starts after the second time period T2. Specifically, as illustrated in FIG. 12, which will be described below, during a normal diagnosis period (failure detection time period) after the circuit device starts (after power is input or the like), a time period which is configured by the first time period T1 in which the operation mode is set to the first mode M1, and the second time period T2 in which the operation mode is set to the second mode M2 is repeated. By doing so, it is possible to perform normal failure diagnosis of the circuit device.

Lengths of pulse widths (time period of an H level) of the switch signals ϕF and XϕF may be much longer than a delay which is generated by filter processing of the low pass filter in the filter unit 90.

For example, it is assumed that a signal level of the physical quantity signal is a zero level. Then, in B1 of FIG. 2, the operation mode is set to the first mode M1. Accordingly, the physical quantity signal Q1 from the first detection circuit 82 is input to the first filter 92, the output signal QA1 of the first filter 92 becomes the physical quantity signal whose filter processing is completed, and a signal level thereof becomes a zero level.

In addition, in the present embodiment, a leakage signal is arbitrarily generated in the physical quantity transducer 18 (FIG. 6), and an expected value TG (leakage expected value, target level) of a signal level of an undesired signal which is the leakage signal is set. Then, the operation mode is set to the first mode M1 in B2 of FIG. 2, and thereby the undesired signal Q2 from the second detection circuit 84 is input to the second filter 94. In addition, if there is no failure or the like, a signal level of the output signal QA2 of the second filter 94 approximately coincides with the expected value TG.

Hence, for example, a control unit 140 (FIG. 6) in the rear stage detects that the signal level (A/D converted value) of the output signal QA2 of the second filter 94 is within a given determination range (within an error range) including the expected value TG, in B2 of FIG. 2, and thus, it is possible to detect failure of the second filter 94. In addition, it is also possible to detect failure of a circuit in a path which passes through the second filter 94. For example, it is possible to detect failure of the second filter 94 and the synchronization detection circuit 81 (the second detection circuit 84).

In addition, as the operation mode is set to the second mode M2 in B3 of FIG. 2, the physical quantity signal Q1 from the first detection circuit 82 is input to both the first and second filters 92 and 94. Accordingly, if there is no failure or the like, signal levels of the output signal QA1 of the first filter 92 and the output signal QA2 of the second filter 94 have to coincide with each other in B3. For example, if the signal level of the physical quantity signal is a zero level, the signal levels of the output signal QA1 and the output signal QA2 coincide in a zero level. Hence, in addition, in a case where the signal levels of the output signal QA1 and the output signal QA2 do not coincide with each other (in a case where the signal levels have values different from each other), the control unit 140 in the rear stage can determine that one of the first filter 92 and the second filter 94 fails. Determination of coincidence or non-coincidence can be made by determining coincidence or non-coincidence within a given error range. For example, in a case where the signal level of the output signal QA2 is not within a given determination range (within an error range) using the signal level of the output signal QA1 as reference, the control unit 140 can determine that the signal levels do not coincide, and determine that the first filter 92 or the second filter 94 fails.

As described above, according to the configuration example of FIG. 1, it is possible to detect failure of the first and second filters 92 and 94 of the filter unit 90 in the rear stage of the synchronization detection circuit 81. Then, by repeating a time period which is configured by the first time period T1 in which the operation mode is set to the first mode M1 and the second time period T2 in which the operation mode is set to the second mode M2, it is possible to perform normal failure diagnosis of the first and second filters 92 and 94.

In addition, in any case of the first time period T1 and the second time period T2, the physical quantity signal Q1 from the first detection circuit 82 is output to the A/D conversion circuit 100 through the first filter 92, and the control unit 140 can capture the A/D converted value of the physical quantity signal. Hence, the control unit 140 (DSP unit 110) can continuously perform capture processing even with respect to the physical quantity signal, while performing normal failure diagnosis of the first and second filters 92 and 94. As a result, it is possible to perform both normal failure diagnosis with high reliability, and normal capture of the physical quantity signal.

2. Second Configuration Example

Figure 3:
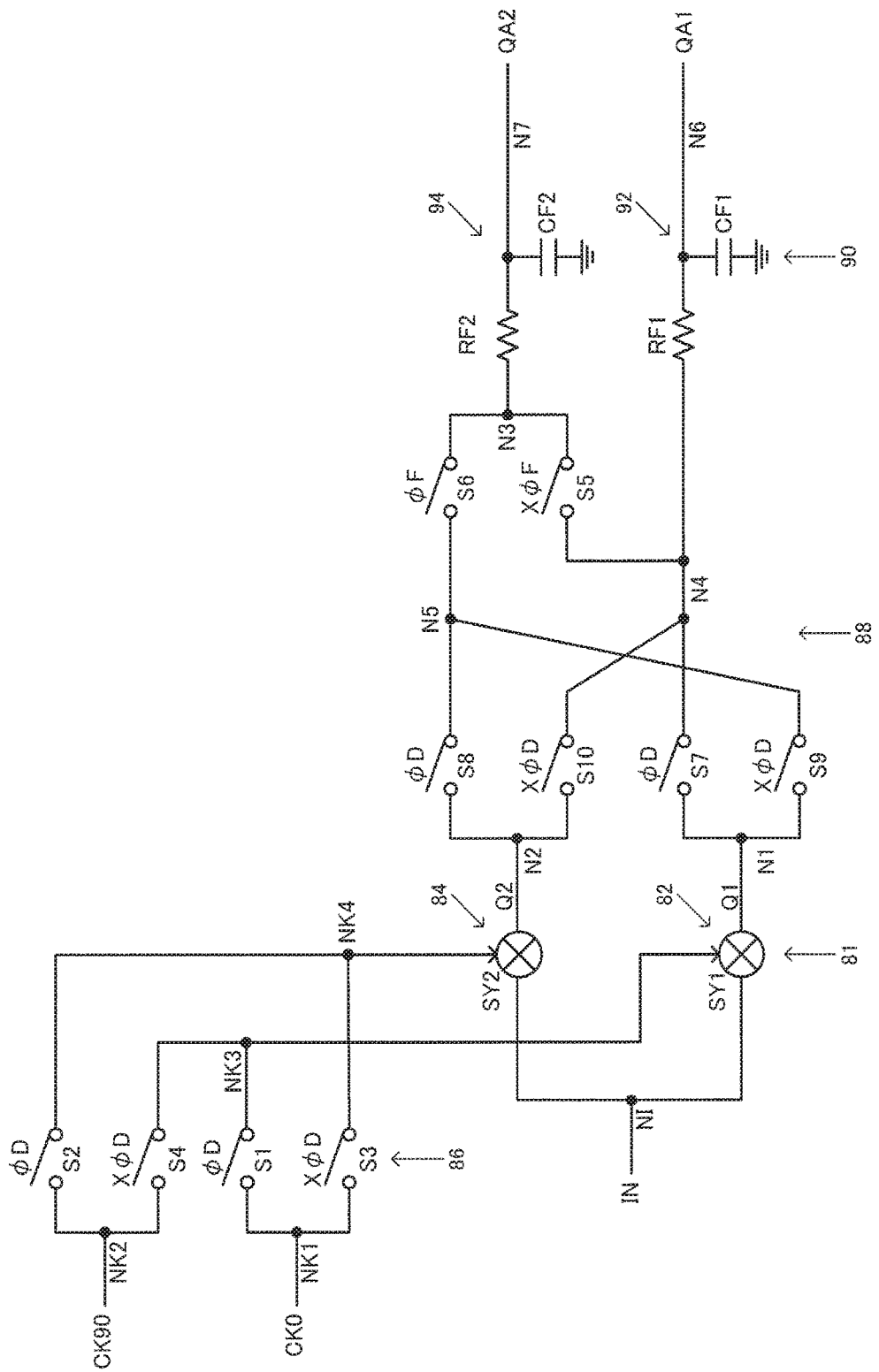
FIG. 3 is a second configuration example of the circuit device according to the present embodiment.

FIG. 3 illustrates a second configuration example of the circuit device according to the present embodiment. The circuit device of FIG. 3 includes the synchronization detection circuit 81 and the filter unit 90. In FIG. 3, the first and second clock signals CK0 and CK90 which are input to detection circuits 82 and 84 of the synchronization detection circuit 81 are interchanged.

In the second configuration example, first, second, third, and fourth modes are prepared as operation modes.

In the first and second modes, the detection circuits 82 and 84 perform the same operation as in the configuration example of FIG. 1. That is, the first detection circuit 82 performs synchronization detection of the physical quantity signal based on the first clock signal CK0 and outputs the physical quantity signal, and the second detection circuit 84 performs synchronization detection of an undesired signal based on the second clock signal CK90.

In contrast to this, in the third and fourth modes, roles of the detection circuits 82 and 84 are interchanged. That is, in the third and fourth modes, the first detection circuit 82 performs synchronization detection of the undesired signal based on the second clock signal CK90 and outputs the undesired signal, and the second detection circuit 84 performs synchronization detection of the physical quantity signal based on the first clock signal CK0 and outputs the physical quantity signal.

(1) Specifically, in the first mode, the physical quantity signal from the first detection circuit 82 is input to the first filter 92, and the undesired signal from the second detection circuit 84 is input to the second filter 94.

That is, in the first mode, the first detection circuit 82 outputs the physical quantity signal as the output signal Q1, and the second detection circuit 84 outputs the undesired signal as the output signal Q2. In addition, in the first mode, the output signal Q1 from the first detection circuit 82 is input to the first filter 92, and the output signal Q2 from the second detection circuit 84 is input to the second filter 94. Hence, the physical quantity signal which is the output signal Q1 from the first detection circuit 82 is input to the first filter 92, and the undesired signal which is the output signal Q2 from the second detection circuit 84 is input to the second filter 94.

(2) In addition, in the second mode, the physical quantity signal from the first detection circuit 82 is input to the first and second filters 92 and 94.

That is, in the second mode, the first detection circuit 82 outputs the physical quantity signal as the output signal Q1, and the second detection circuit 84 outputs the undesired signal as the output signal Q2. In addition, in the second mode, the output signal Q1 from the first detection circuit 82 is input to the first and second filters 92 and 94. Hence, the physical quantity signal which is the output signal Q1 from the first detection circuit 82 is input to the first and second filters 92 and 94.

(3) In addition, in the third mode, the undesired signal from the first detection circuit 82 is input to the second filter 94, and the physical quantity signal from the second detection circuit 84 is input to the first filter 92.

That is, in the third mode, the first detection circuit 82 outputs the undesired signal as the output signal Q1, and the second detection circuit 84 outputs the physical quantity signal as the output signal Q2. In addition, in the third mode, the output signal Q1 from the first detection circuit 82 is input to the second filter 94, and the output signal Q2 from the second detection circuit 84 is input to the first filter 92. Hence, the undesired signal which is the output signal Q1 from the first detection circuit 82 is input to the second filter 94, and the physical quantity signal which is the output signal Q2 from the second detection circuit 84 is input to the first filter 92.

(4) In addition, in the fourth mode, the physical quantity signal from the second detection circuit 84 is input to the first and second filters 92 and 94.

That is, in the fourth mode, the first detection circuit 82 outputs the undesired signal as the output signal Q1, and the second detection circuit 84 outputs the physical quantity signal as the output signal Q2. In addition, in the fourth mode, the output signal Q2 from the second detection circuit 84 is input to the first and second filters 92 and 94. Hence, the physical quantity signal from the second detection circuit 84 is input to the first and second filters 92 and 94.

Specifically, in FIG. 3, the signal selection circuit 88, which is provided between the synchronization detection circuit 81 and the filter unit 90, includes switch elements S7, S8, S9, and S10 in addition to the switch elements S5 and S6 illustrated in FIG. 1. Connection configurations and operations of the switch elements S5 and S6 are the same as those described with reference to FIG. 1, and thus, detailed description thereof will be omitted.

The switch element S7 is provided between an output node N1 of the first detection circuit 82 and a node N4, and turned on or off by a switch signal φD. The switch element S8 is provided between an output node N2 of the second detection circuit 84 and a node N5, and turned on or off by the switch signal φD. The switch element S9 is provided between the output node N1 of the first detection circuit 82 and the node N5, and turned on or off by the switch signal XφD. The switch element S10 is provided between the output node N2 of the second detection circuit 84 and the node N4, and turned on or off by the switch signal XφD.

Here, the node N4 becomes an input node of the first filter 92. In addition, the switch element S5 is provided between the node N4 and an input node N3 of the second filter 94. The switch element S6 is provided between the node N5 and the input node N3 of the second filter 94.

In the first mode, the switch signal φD and a switch signal φF have an H level (active level), and thereby the switch elements S7, S8, and S6 are turned on. In addition, the switch signal XφD and a switch signal XφF have an L level (inactive level), and thereby the switch elements S9, S10, and S5 are turned off. Accordingly, the signal selection circuit 88 outputs the physical quantity signal Q1 from the first detection circuit 82 to the first filter 92, and outputs the undesired signal Q2 from the second detection circuit 84 to the second filter 94, in the first mode.

In the second mode, the switch signals φD and XφF have an H level, and thereby the switch elements S7, S8, and S5 are turned on. In addition, the switch signals XφD and φF have an L level, and thereby the switch elements S9, S10, and S6 are turned off. Accordingly, the signal selection circuit 88 outputs the physical quantity signal Q1 from the first detection circuit 82 to the first filter 92 and the second filter 94.

In the third mode, the switch signals XφD and φF have an H level, and thereby the switch elements S9, S10, and S6 are turned on. In addition, the switch signals φD and XφF have an L level, and thereby the switch elements S7, S8, and S5 are turned off. Accordingly, the signal selection circuit 88 outputs the undesired signal Q1 from the first detection circuit 82 to the second filter 94, and outputs the physical quantity signal Q2 from the second detection circuit 84 to the first filter 92.

In the fourth mode, the switch signals XφD and XφF have an H level, and thereby the switch elements S9, S10, and S5 are turned on. In addition, the switch signals φD and φF have an L level, and thereby the switch elements S7, S8, and S6 are turned off. Accordingly, the signal selection circuit 88 outputs the physical quantity signal Q2 from the second detection circuit 84 to the first filter 92 and the second filter 94, in the fourth mode.

In addition, in FIG. 3, a selection circuit 86 is provided in the circuit device. The selection circuit 86 receives the first and second clock signals CK0 and CK90, and outputs synchronization signals SY1 and SY2 to the first and second detection circuits 82 and 84. For example, in the first and second modes, the selection circuit 86 outputs the first and second clock signals CK0 and CK90 to the first and second detection circuits 82 and 84 as the synchronization signals SY1 and SY2, respectively. Meanwhile, in the third and fourth modes, the selection circuit 86 outputs the second and first clock signals CK90 and CK0 to the first and second detection circuits 82 and 84 as the synchronization signals SY1 and SY2, respectively.

Specifically, the selection circuit 86 includes the switch elements S1, S2, S3, and S4. The switch elements S1 to S4 are configured by, for example, N type transistors, transfer gates, or the like.

The switch element S1 is provided between an input node NK1 of the first clock signal CK0 and an output node NK3 of the synchronization signal SY1. The switch element S2 is provided between an input node NK2 of the second clock signal CK90 and an output node NK4 of the synchronization signal SY2. The switch element S3 is provided between the input node NK1 of the first clock signal CK0 and the output node NK4 of the synchronization signal SY2. The switch element S4 is provided between the input node NK2 of the second clock signal CK90 and the output node NK3 of the synchronization signal SY1.

In the first and second modes, the switch signal ϕD has an H level (active level), and thereby the switch elements S1 and S2 are turned on. In addition, the switch signal XϕD has an L level (inactive level), and thereby the switch elements S3 and S4 are turned off. Accordingly, the first and second clock signals CK0 and CK90 are respectively input to the first and second detection circuits 82 and 84 as the synchronization signals SY1 and SY2.

Meanwhile, in the third and fourth modes, the switch signal XϕD has an H level, and thereby the switch elements S3 and S4 are turned on. In addition, the switch signal ϕD has an L level, and thereby the switch elements S1 and S2 are turned off. Accordingly, the second and first clock signals CK90 and CK0 are respectively input to the first and second detection circuits 82 and 84 as the synchronization signals SY1 and SY2. That is, in the first and second modes, and in the third and fourth modes, the first and second clock signals CK0 and CK90 which are input to the synchronization detection circuit 81 are interchanged.

Figure 4:
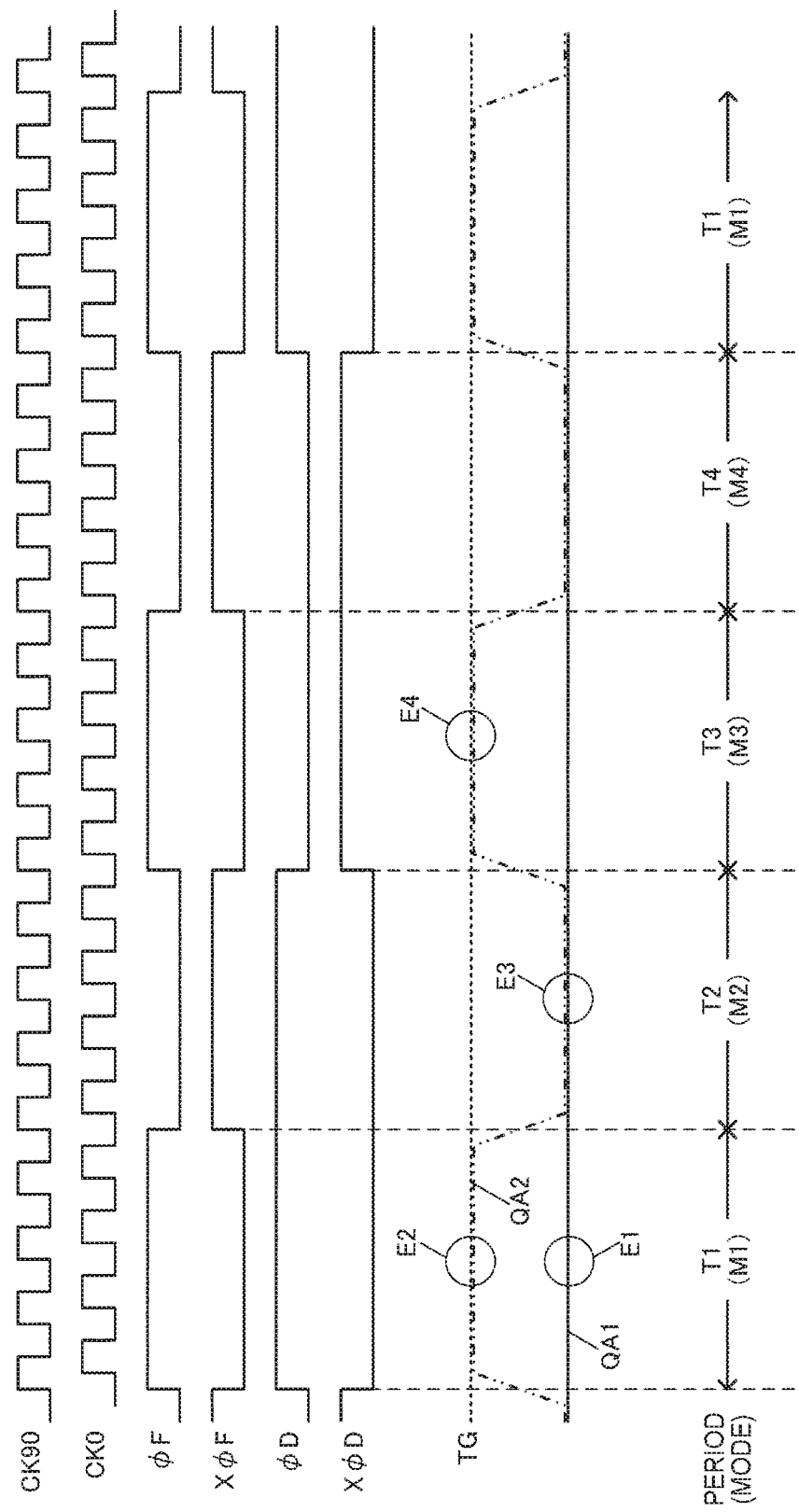
FIG. 4 is a signal waveform diagram illustrating an operation of the circuit device according to the second configuration example.

FIG. 4 is a signal waveform diagram illustrating an operation of the circuit device of FIG. 3.

(1) In a first time period T1 of FIG. 4, the switch signals ϕD and ϕF have an H level, and thereby the operation mode is set to the first mode M1.

That is, if the switch signal ϕD has an H level, the switch elements S1 and S2 of FIG. 3 are turned on, and thereby the first and second clock signals CK0 and CK90 are supplied to the first and second detection circuits 82 and 84. Accordingly, the first detection circuit 82 outputs the physical quantity signal and the second detection circuit 84 outputs the undesired signal. In addition, if the switch signals ϕD and ϕF have an H level, the switch elements S7, S8, and S6 are turned on. Accordingly, the physical quantity signal Q1 from the first detection circuit 82 is input to the first filter 92 through the switch element S7, and the undesired signal Q2 from the second detection circuit 84 is input to the second filter 94 through the switch elements S8 and S6.

(2) In a second time period T2, the switch signals ϕD and XϕF have an H level, and thereby the operation mode is set to the second mode M2.

That is, if the switch signal ϕD has an H level, the switch elements S1 and S2 are turned on, and thereby the first detection circuit 82 outputs the physical quantity signal and the second detection circuit 84 outputs the undesired signal. In addition, if the switch signals ϕD and XϕF have an H level, the switch elements S7, S8, and S5 are turned on. Accordingly, the physical quantity signal Q1 from the first detection circuit 82 is input to the first and second filters 92 and 94.

(3) In a third time period T3, the switch signals XϕD and ϕF have an H level, and thereby the operation mode is set to the third mode M3.

That is, if the switch signal XϕD has an H level, the switch elements S3 and S4 are turned on, and thereby the first and second clock signals CK0 and CK90 are supplied to the first and second detection circuits 82 and 84. Accordingly, the first detection circuit 82 outputs the undesired signal and the second detection circuit 84 outputs the physical quantity signal. In addition, if the switch signals XϕD and ϕF have an H level, the switch elements S9, S10, and S6 are turned on. Accordingly, the undesired signal Q1 from the first detection circuit 82 is input to the second filter 94 through the switch elements S9 and S6, and the physical quantity signal Q2 from the second detection circuit 84 is input to the first filter 92 through the switch element S10.

(4) In a fourth time period T4, the switch signals XϕD and XϕF have an H level, and thereby the operation mode is set to the fourth mode M4.

That is, if the switch signal XϕD has an H level, the switch elements S3 and S4 are turned on, and thereby the first detection circuit 82 outputs the undesired signal and the second detection circuit 84 outputs the physical quantity signal. In addition, if the switch signals XϕD and XϕF have an H level, the switch elements S9, S10, and S5 are turned on. Accordingly, the physical quantity signal Q2 from the second detection circuit 84 is input to the first and second filters 92 and 94.

In FIG. 4, when the switch signals ϕD and ϕF have an H level, a time period which is set to the first mode M1 becomes the first time period T1. When the switch signals ϕD and XϕF have an H level, a time period which is set to the second mode M2 becomes the second time period T2. When the switch signals XϕD and ϕF have an H level, and a time period which is set to the third mode M3 becomes the third time period T3. When the switch signals XϕD and XϕF have an H level, and a time period which is set to the fourth mode M4 becomes the fourth time period T4.

In addition, in the present embodiment, as illustrated in FIG. 4, time periods are repeated which are configured by the first time period T1, the second time period T2, the third time period T3, and the fourth time period T4. For example, the time periods which are configured by the first to fourth time periods T1, T2, T3, and T4 are repeated such that the second time period T2 is positioned after the first time period T1, the third time period T3 is positioned after the second time period T2, the fourth time period T4 is positioned after the third time period T3, the first time period T1 is positioned after the fourth time period T4, and the second time period T2 is positioned after the first time period T1. Specifically, as illustrated in FIG. 12, during a normal diagnosis period after an operation start of the circuit device, the time periods which are configured by the first to fourth time periods T1, T2, T3, and T4 are repeated. By doing so, it is possible to perform the normal failure diagnosis of the circuit device.

Lengths of pulse widths (period of an H level) of the switch signals ϕF and XϕF may be much longer than delay which is generated by filter processing of the low pass filter in the filter unit 90. In addition, the switch signals ϕD and XϕD can be generated by performing frequency division of, for example, the switch signals ϕF and XϕF, and a division ratio thereof is not limited to a specific ratio.

For example, it is assumed that a signal level of the physical quantity signal is a zero level. Then, in E1 of FIG. 4, the operation mode is set to the first mode M1, and thus, the physical quantity signal Q1 from the first detection circuit 82 is input to the first filter 92. In addition, the output signal QA1 of the first filter 92 becomes the physical quantity signal whose filter processing is completed, and a signal level thereof becomes a zero level.

In addition, in E2 of FIG. 4, the operation mode is set to the first mode M1, and thus, the undesired signal Q2 from the second detection circuit 84 is input to the second filter 94. In addition, if there is no failure or the like, a signal level of the output signal QA2 of the second filter 94 approximately coincides with the expected value TG.

Hence, the control unit 140 in the rear stage detects that the signal level of the output signal QA2 of the second filter 94 is within a given determination range including the expected value TG, and thus, it is possible to detect failure of a circuit (second detection circuit 84) in a path which passes through the first filter 92 or the second filter 94.

In addition, in E3 of FIG. 4, the operation mode is set to the second mode M2, and thus, the physical quantity signal Q1 from the first detection circuit 82 is input to both the first filter 92 and the second filter 94. Then, if there is no failure or the like, signal levels of the output signal QA1 of the first filter 92 and the output signal QA2 of the second filter 94 have to coincide with each other, in E3. For example, if the signal level of the physical quantity signal is a zero level, the signal levels of the output signal QA1 and the output signal QA2 coincide with each other at a zero level. Hence, in a case where the signal levels of the output signal QA1 and the output signal QA2 do not coincide with each other, the control unit 140 in the rear stage can determine that one of the first filter 92 and the second filter 94 fails. Determination of coincidence or non-coincidence can be made by determining coincidence or non-coincidence within a given error range as described above.

In E4 of FIG. 4, a circuit which performs synchronization detection of the undesired signal is interchanged with respect to E2. For example, in E2, the operation mode is set to the first mode M1 and thus, the second detection circuit 84 outputs the undesired signal, but, in E4, the operation mode is set to the third mode M3, and thus, the first detection circuit 82 outputs the undesired signal. In addition, a signal which is obtained by performing filer processing of the undesired signal from the first detection circuit 82 is output from the second filter 94 as the output signal QA2. Accordingly, if there is no failure of the first detection circuit 82, the signal level of the output signal QA2 approximately coincides with the expected value TG.

Hence, in a case where the signal level of the output signal QA2 is not within a given determination range including the expected value TG during the third time period T3, the control unit 140 in the rear stage can determine that the first detection circuit 82 fails. Alternatively, by determining coincidence or non-coincidence of the signal level of the output signal QA2 in E2 and the signal level of the output signal QA2 in E4, it is possible to detect failure of the first and second detection circuits 82 and 84.

As described above, according to the second configuration example of FIG. 3, it is possible to perform normal failure detection of the first and second detection circuits 82 and 84, and the first and second filters 92 and 94. In addition, the physical quantity signal whose filter processing is completed is constantly output from the first filter 92 as the output signal QA1, and thus, the control unit 140 (DSP unit 110) can perform processing by continuously capturing the physical quantity signal.

For example, in the configuration example of FIG. 1 or a circuit of the related art, a mode does not start in which the first detection circuit 82 outputs the undesired signal for failure detection, and thus, there is a problem that it is difficult to independently detect failures of the first detection circuit 82. For example, by detecting that the signal level of the signal Q2 is within a given determination range including the expected value TG, it is possible to detect failure of the second detection circuit 84, but if there is failure in the first detection circuit 82, there is a problem that the failure cannot be detected.

Due to this point, in the second configuration example of FIG. 3, a circuit which detects the undesired signal in E2 and E4 of FIG. 4 is interchanged. For example, in E2 in the first time period T1, a mode starts in which the second detection circuit 84 outputs the undesired signal for failure detection. Hence, by determining whether or not the undesired signal is within the determination range including the expected value TG, it is possible to detect failure of the second detection circuit 84. In addition, in E4 in the third time period T3, a mode starts in which the first detection circuit 82 outputs the undesired signal for failure detection. Hence, by determining whether or not the undesired signal is within the determination range including the expected value TG, it is possible to detect failure of the first detection circuit 82. Hence, there is an advantage in which failure of both the first detection circuit 82 and the second detection circuit 84 (and circuits in paths thereof) can be detected.

For example, applications such applications for a vehicle require high reliability, and also require various types of determination processing (for example, posture determination) performed by continuous capture of the physical quantity signal. Accordingly, normal failure diagnosis with high reliability is required, and it is necessary for the synchronization detection circuit 81 to output the physical quantity signal by performing continuous synchronization detection.

Due to this point, in the circuit device according to the present embodiment, it is possible to capture the physical quantity signal which is output from the first detection circuit 82, and to perform failure detection of the second detection circuit 84, based on the undesired signal which is output from the second detection circuit 84, in the first and second time periods T1 and T2 of the first and second modes M1 and M2. In addition, it is possible to perform failure detection of the first and second filters 92 and 94 of the filter unit 90.

In addition, it is possible to capture the physical quantity signal which is output from the second detection circuit 84, and to perform failure detection of the first detection circuit 82, based on the undesired signal which is output from the first detection circuit 82, in the third and fourth time periods T3 and T4 of the third and fourth modes M3 and M4. In addition, it is also possible to perform failure detection of the first and second filters 92 and 94 of the filter unit 90.

Hence, as illustrated in FIG. 4, by repeating the time periods which are configured by the first, second, third, and fourth time periods T1, T2, T3, and T4, it is possible to perform both normal failure diagnosis with high reliability and normal capture of the physical quantity signal.

As described above, according to the second configuration example of FIG. 3, the control unit 140 (DSP unit 110) can continuously capture the physical quantity signal, while performing normal failure diagnosis of the first and second detection circuits 82 and 84 and the first and second filters 92 and 94. Hence, it is possible to perform both normal failure diagnosis with high reliability and normal capture of the physical quantity signal.

Figure 5B:
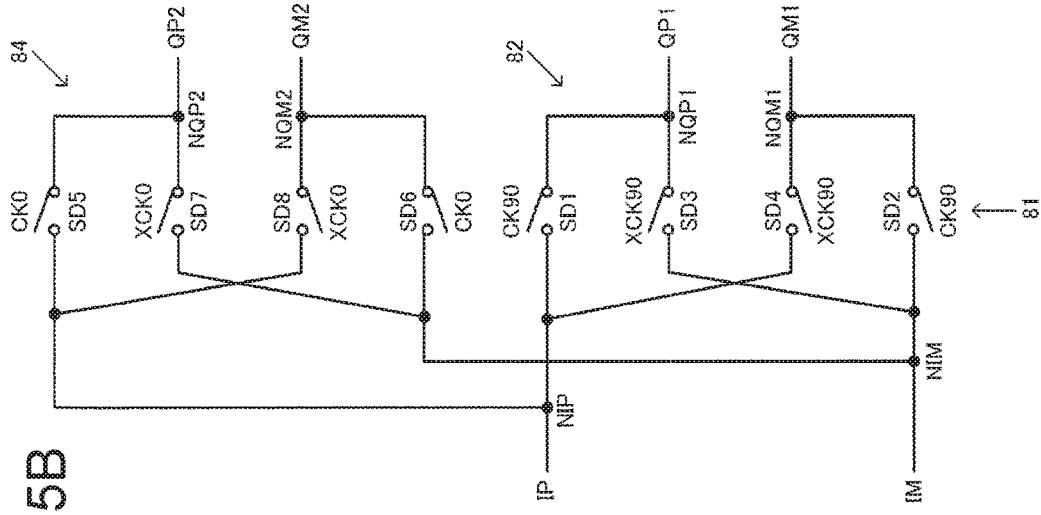
FIGS. 5A and 5B are detailed configuration examples of a synchronization detection circuit.
Figure 5A:
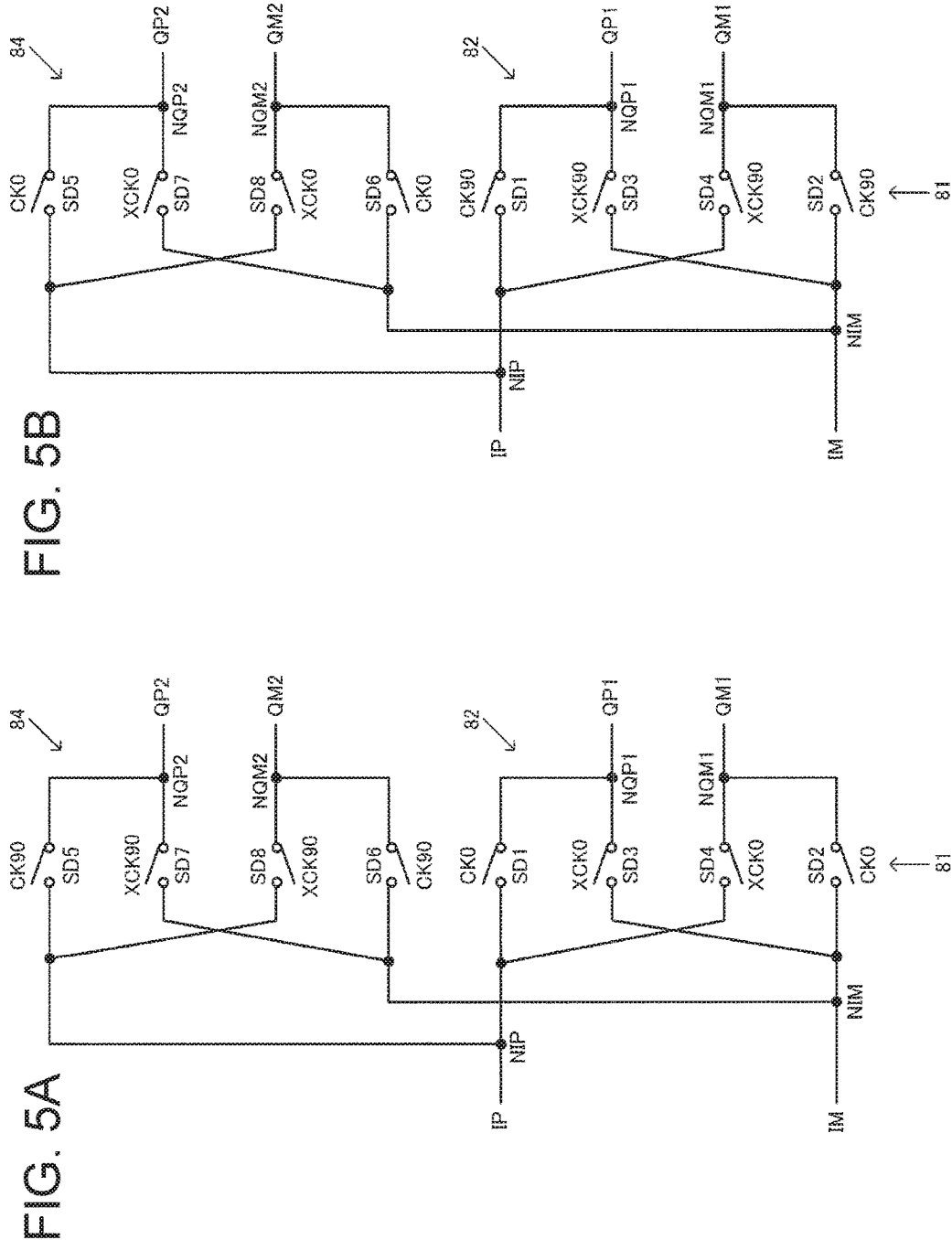

FIGS. 5A and 5B illustrate detailed configuration examples of the first and second detection circuits 82 and 84 of the synchronization detection circuit 81. FIG. 5A illustrates a state when the operation mode is set to the first and second modes M1 and M2, and FIG. 5B illustrates a state when the operation mode is set to the third and fourth modes M3 and M4.

In FIGS. 5A and 5B, the first detection circuit 82 receives a differential input signal which is configured by a positive input signal IP and a negative input signal IM, as an input signal IN. In addition, the first detection circuit outputs a first differential output signal which is configured by a first positive output signal QP1 and a first negative output signal QM1.

In addition, the second detection circuit 84 receives a differential input signal which is configured by the positive input signal IP and the negative input signal IM, as the input signal IN. In addition, the second detection circuit 84 outputs a second differential output signal which is configured by a second positive output signal QP2 and a second negative output signal QM2.

In addition, in a case where an operation mode is set to the first and second modes M1 and M2, the first detection circuit 82 outputs a physical quantity signal as the first differential output signals QP1 and QM1, and the second detection circuit 84 outputs an undesired signal as the second differential output signals QP2 and QM2. Meanwhile, in a case where the operation mode is set to the third and fourth modes M3 and M4, the first detection circuit 82 outputs the undesired signal as the first differential output signals QP1 and QM1, and the second detection circuit 84 outputs the physical quantity signal as the second differential output signals QP2 and QM2.

Specifically, as illustrated in FIGS. 5A and 5B, the first detection circuit 82 includes a first switch element SD1, a second switch element SD2, a third switch element SD3, and a fourth switch element SD4. The switch elements SD1 to SD4 are configured by N type transistors, transfer gates, or the like.

The first switch element SD1 is provided between a positive input node NIP of the positive input signal IP and a positive output node NQP1 of the first positive output signal QP1. In addition, the first switch element SD1 is turned on or off based on the first clock signal CK0 in the first and second modes M1 and M2 of FIG. 5A, and turned on or off based on the second clock signal CK90 in the third and fourth modes M3 and M4 of FIG. 5B.

The second switch element SD2 is provided between a negative input node NIM of the negative input signal IM and a negative output node NQM1 of the negative output signal QM1. In addition, the second switch element SD2 is turned on or off based on the first clock signal CK0 in the first and second modes M1 and M2 of FIG. 5A, and turned on or off based on the second clock signal CK90 in the third and fourth modes M3 and M4 of FIG. 5B.

The third switch element SD3 is provided between the negative input node NIM and the positive output node NQP1, and is turned on or off based on an inverted clock signal XCK0 which is an inverted signal of the first clock signal CK0 in the first and second modes M1 and M2 of FIG. 5A. In addition, the third switch element SD3 is turned on or off based on an inverted clock signal XCK90 which is an inverted signal of the second clock signal CK90 in the third and fourth modes M3 and M4 of FIG. 5B.

The fourth switch element SD4 is provided between the positive input node NIP and the negative output node NQM1. In addition, the fourth switch element SD4 is turned on or off based on the inverted clock signal XCK0 in the first and second modes M1 and M2, and is turned on or off based on the inverted clock signal XCK90 in the third and fourth modes M3 and M4.

The second detection circuit 84 includes a fifth switch element SD5, a sixth switch element SD6, a seventh switch element SD7, and an eighth switch element SD8. The switch elements SD5 to SD8 are configured by N type transistors, transfer gates, or the like.

The fifth switch element SD5 is provided between the positive input node NIP and a positive output node NQP2 of the positive output signal QP2. In addition, the fifth switch element SD5 is turned on or off based on the second clock signal CK90 in the first and second modes M1 and M2, and is turned on or off based on the first clock signal CK0 in the third and fourth modes M3 and M4.

The sixth switch element SD6 is provided between the negative input node NIM and a negative output node NQM2 of the negative output signal QM2. In addition, the sixth switch element SD6 is turned on or off based on the second clock signal CK90 in the first and second modes M1 and M2, and is turned on or off based on the first clock signal CK0 in the third and fourth modes M3 and M4.

The seventh switch element SD7 is provided between the negative input node NIM and the positive output node NQP2. In addition, the seventh switch element SD7 is turned on or off based on the inverted clock signal XCK90 in the first and second modes M1 and M2, and is turned on or off based on the inverted clock signal XCK0 in the third and fourth modes M3 and M4.

The eighth switch element SD8 is provided between the positive input node NIP and the negative output node NQM2. In addition, the eighth switch element SD8 is turned on or off based on the inverted clock signal XCK90 in the first and second modes M1 and M2, and is turned on or off based on the inverted clock signal XCK0 in the third and fourth modes M3 and M4.

The synchronization detection circuit 81 which is configured as described above with reference to FIGS. 5A and 5B can perform synchronization detection of the differential signals, and perform normal failure detection and normal capture of the physical quantity signal.

3. Overall System Configuration Example

Figure 6:
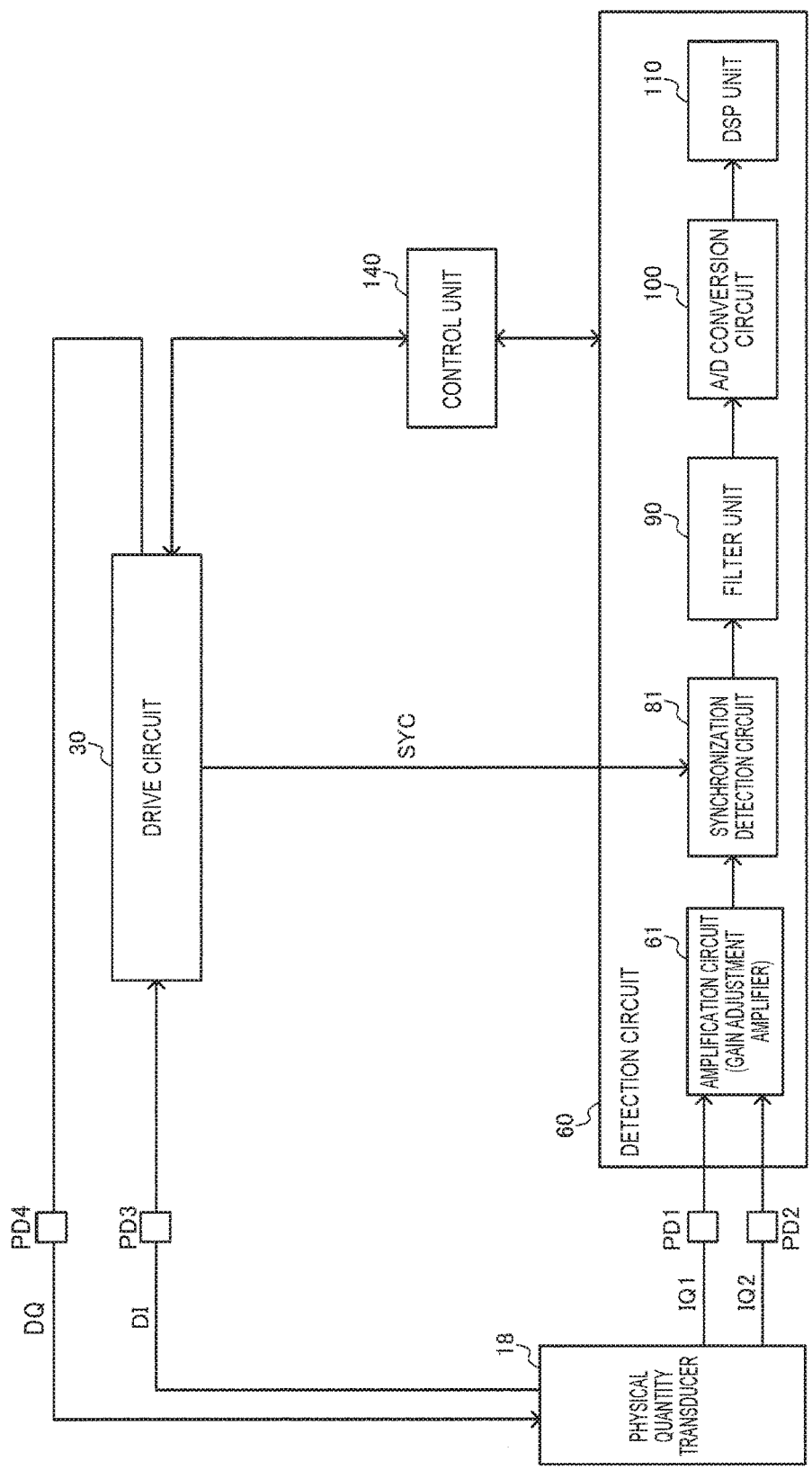
FIG. 6 is an overall system configuration example of the circuit device.

FIG. 6 is an overall system configuration example of the circuit device according to the present embodiment. The circuit device of FIG. 6 includes a drive circuit 30, a detection circuit 60, and a control unit 140.

The drive circuit 30 drives a physical quantity transducer 18. For example, the drive circuit 30 drives the physical quantity transducer 18 by receiving a feedback signal DI from the physical quantity transducer 18 and outputting a drive signal DQ corresponding to the feedback signal DI. First and second detection signals IQ1 and IQ2 from the physical quantity transducer 18 are input to the detection circuit 60 of the circuit device through terminals PD1 and PD2 (pads). In addition, the feedback signal DI from the physical quantity transducer 18 is input to the drive circuit 30 of the circuit device through a terminal PD3 (pad), and the drive circuit 30 outputs the drive signal DQ to the physical quantity transducer 18 through a terminal PD4 (pad).

The detection circuit 60 includes an amplification circuit 61, a synchronization detection circuit 81, a filter unit 90, an A/D conversion circuit 100, and a DSP unit 110 (digital signal processing unit). Configurations and operations of the synchronization detection circuit 81 and the filter unit 90 are the same as those described above with reference to FIG. 1 to FIG. 5B. Accordingly, the amplification circuit 61, the A/D conversion circuit 100, and the DSP unit 110 will be described in detail below.

The detection circuit 60 is not limited to the configuration of FIG. 6, and various modifications such as, omitting a part of configuration elements thereof or adding other configuration elements thereto can be made. For example, the detection circuit 60 may be an analog type detection circuit which outputs analog detection results, without the A/D conversion circuit 100 or the DSP unit 110.

The control unit 140 performs various types of control processing. For example, the control unit 140 performs control processing of the drive circuit 30 or control processing of the detection circuit 60. In addition, the control unit 140 performs setting processing of operation modes such as the aforementioned first to fourth modes. In addition, the control unit 140 performs processing of failure determination of the synchronization detection circuit 81 or the filter unit 90. The control unit 140 can be configured by a logic circuit which is formed by using an automatic wiring method, such as a gate array, a processor which operates based on firmware or the like, or the like.

4. Detailed Configuration of Electronic Apparatus, Gyro Sensor, and Circuit Device FIG. 7 illustrates a detailed configuration example of a circuit device 20 according to the present embodiment, a gyro sensor 510 (physical quantity detection device in a broad sense) including the circuit device 20, and an electronic apparatus 500 including the gyro sensor 510.

Figure 7:
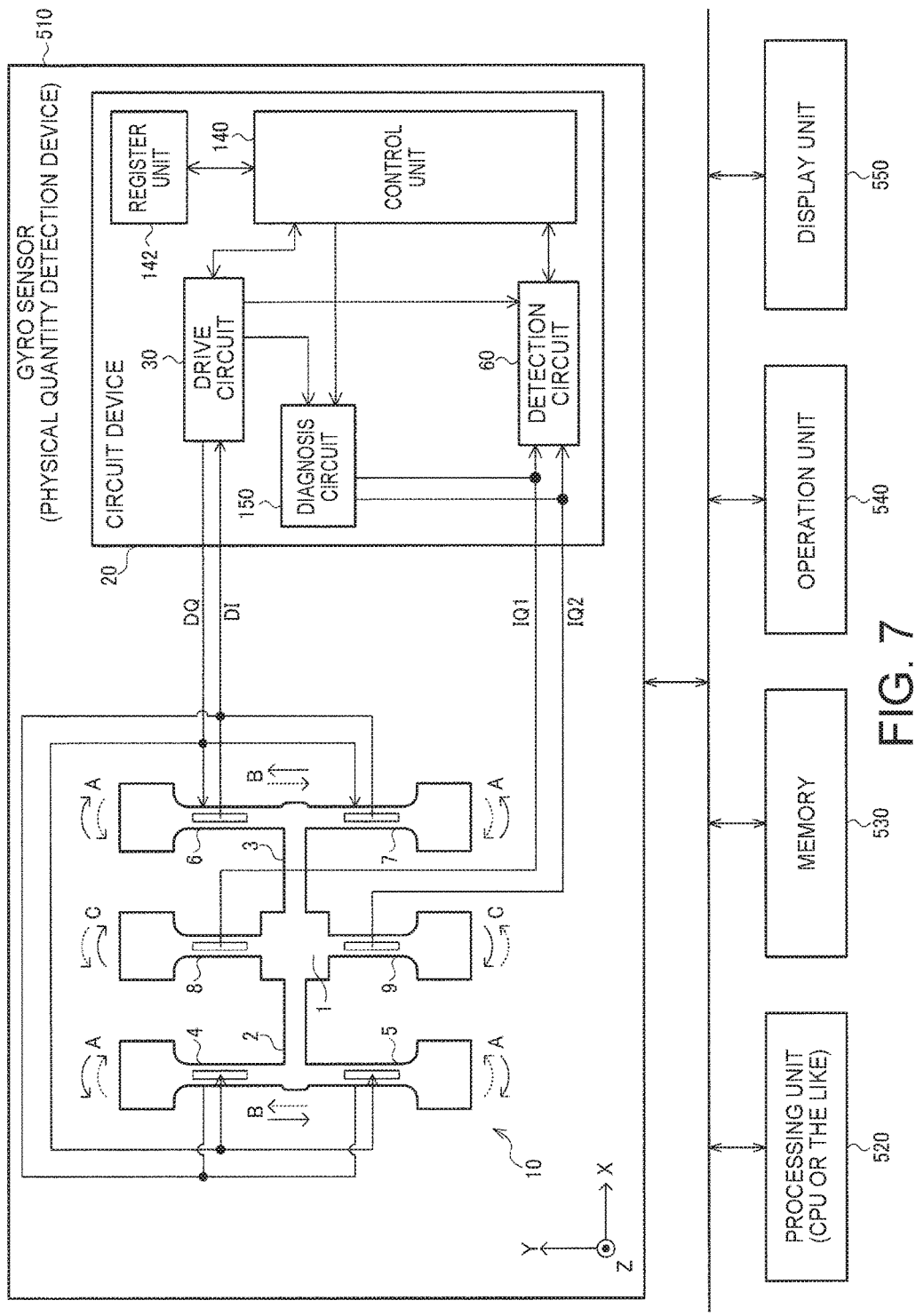
FIG. 7 is a configuration example of the circuit device, an electronic apparatus, and a gyro sensor (physical quantity detection device) according to the present embodiment.

The circuit device 20, the electronic apparatus 500, and the gyro sensor 510 are not limited to the configuration of FIG. 7, and various modifications such as, omitting a part of configuration elements thereof or adding other configuration elements thereto can be made. In addition, various apparatuses such as, a digital camera, a video camera, a smart phone, a cellular phone, a car navigation system, a robot, a living body information detection apparatus, a game machine, a timepiece, a health appliance, or a portable information terminal, can be used as the electronic apparatus 500 according to the present embodiment. In addition, a case where a physical quantity transducer is a voltage type vibration reed (vibration gyro) and the sensor is a gyro sensor will be hereinafter described as an example, but the invention is not limited to this. For example, the invention can also be applied to a vibration gyro which is formed of, for example, a silicon substrate or the like and uses a capacitance detection method, a physical quantity transducer which detects physical quantity equivalent to angular velocity information or physical quantity other than the angular velocity information, or the like.

The electronic apparatus 500 includes the gyro sensor 510 and a processing unit 520. In addition, the electronic apparatus 500 can include a memory 530, an operation unit 540, and a display unit 550. The processing unit 520 (controller) which is configured by a CPU, an MPU, or the like performs control of the gyro sensor 510 or the like, or an overall control of the electronic apparatus 500. In addition, the processing unit 520 performs processing based on the angular velocity information (physical quantity in a broad sense) which is detected by the gyro sensor 510. For example, the processing unit 520 performs processing for camera shake correction, posture control, assisted GPS navigation, or the like, based on the angular velocity information. The memory 530 (ROM, RAM, or the like) stores a control program or various types of data, and functions as a work area or a data storage area. The operation unit 540 which is required for a user to operate the electronic apparatus 500, and the display unit 550 displays various types of information for the user.

The gyro sensor 510 (physical quantity detection device) includes a vibration reed 10 and the circuit device 20. The vibration reed 10 (physical quantity transducer in a broad sense) is a piezoelectric type vibration reed which is formed of a thin plate of a piezoelectric material such as crystal. Specifically, the vibration reed 10 is a double T type vibration reed which is formed of a crystal substrate of Z cut.

The circuit device 20 includes the drive circuit 30, the detection circuit 60, the control unit 140, a register unit 142, and a diagnosis circuit 150. Various modifications such as, omitting a part of configuration elements thereof or adding other configuration elements thereto can be made.

The drive circuit 30 drives the vibration reed 10 by outputting the drive signal DQ. For example, the drive circuit 30 receives the feedback signal DI from the vibration reed 10, and excites the vibration reed 10 by outputting the drive signal DQ corresponding to the feedback signal DI. The detection circuit 60 receives the detection signals IQ1 and IQ2 (detection currents and electric charges) from the vibration reed 10 which is driven by the drive signal DQ, and detects (extracts) a desired signal (Coriolis force signal) according to the physical quantity that is applied to the vibration reed 10 from the detection signals IQ1 and IQ2.

The diagnosis circuit 150 performs diagnosis (self-diagnosis) of the detection circuit 60 (circuit device) in a diagnosis mode (diagnosis period). For example, the diagnosis circuit 150 generates a pseudo desired signal (pseudo angular velocity signal or the like) for diagnosing the detection circuit 60, and performs an operation for supplying the detection circuit 60 with the pseudo desired signal. In addition, diagnosis for determining whether or not the detection circuit 60 or the like performs a normal operation is performed based on detection results of the pseudo desired signal. Detailed description of the diagnosis circuit 150 will be made below.

The vibration reed 10 includes a base section 1, connection arms 2 and 3, drive arms 4, 5, 6, and 7, and detection arms 8 and 9. The detection arms 8 and 9 extend in a +Y axis direction, and a −Y axis direction with respect to the rectangular base section 1. In addition, the connection arms 2 and 3 extend in a −X axis direction, and a +X axis direction with respect to the base section 1. In addition, the drive arms 4 and 5 extend in the +Y axis direction, and the −Y axis direction with respect to the connection arm 2, and the drive arms 6 and 7 extend in the +Y axis direction, and the −Y axis direction with respect to the connection arm 3. Here, the X axis, the Y axis, and the Z axis indicate axes of crystal, and are also called an electrical axis, a mechanical axis, and an optical axis.

The drive signal DQ from the drive circuit 30 is input to drive electrodes provided on upper surfaces of the drive arms 4 and 5, and drive electrodes provided on side surfaces of the drive arms 6 and 7. In addition, signals from drive electrodes provided on side surfaces of the drive arms 4 and 5 and signals from drive electrodes provided on upper surfaces of the drive arms 6 and 7 are input to the drive circuit 30 as the feedback signal DI. In addition, signals from detection electrodes provided on upper surfaces of the detection arms 8 and 9 are input to the detection circuit 60 as the detection signals IQ1 and IQ2. Common electrodes provided on side surfaces of the detection arms 8 and 9 are grounded.

If the drive signal DQ of AC is applied by the drive circuit 30, the drive arms 4 to 7 perform flexural vibration (excitation vibration), which is denoted by arrows A, by inverse piezoelectric effects. That is, tips of the drive arms 4 and 6 repeat approaching and receding from each other, tips of the drive arms 5 and 7 also repeat approaching and receding from each other, and thereby flexural vibration is performed. At this time, the drive arms 4 and 5 and the drive arms 6 and 7 perform vibration which is symmetrical to the Y axis that passes through a central position of the base section 1, and thus, the base section 1, the connection arms 2 and 3, and the detection arms 8 and 9 nearly do not vibrate.

In this state, if an angular velocity which is performed by using a Z axis as a rotation axis with respect to the vibration reed 10 is applied (if the vibration reed 10 rotates in the Z axis), the drive arms 4 to 7 vibrate by Coriolis force as denoted by arrows B. That is, Coriolis force in a direction of the arrow B which is orthogonal to a direction of the arrow A and the Z axis direction is applied to the drive arms 4 to 7, and thereby vibration components in the direction of the arrow B are generated. Vibration of the direction of the arrow B is transferred to the base section 1 through the connection arms 2 and 3, and thereby the detection arms 8 and 9 perform the flexural vibration in a direction of arrows C. Electric charge signals which are generated by piezoelectric effects according to the flexural vibration of the detection arms 8 and 9 are input to the detection circuit 60 as the detection signals IQ1 and IQ2. Here, the vibration of the drive arms 4 to 7 in the direction of the arrow B is vibration in a circumferential direction with respect to the central position of the base section 1, and the vibration of the detection arms 8 and 9 is vibration in the direction of the arrow C in a direction opposite to the arrow B in the circumferential direction. Accordingly, the detection signals IQ1 and IQ2 have phases which are shifted by 90 degrees with respect to the drive signal DQ.

For example, if an angular velocity of the vibration reed 10 (gyro sensor) in the Z axis is referred as ω, mass is referred to as m, and vibration velocity is referred to as v, the Coriolis force is represented by Fc=2m·v·ω. Hence, the detection circuit 60 detects a desired signal which is a signal according to Coriolis force, and thereby an angular velocity ω can be obtained. In addition, the processing unit 520 can perform various types of processing for camera shake correction, posture control, assisted GPS navigation, or the like, by using the obtained angular velocity ω.

FIG. 7 illustrates an example of a case in which the vibration reed 10 has a double T type, but the vibration reed 10 according to the present embodiment is not limited to the structure. For example, the vibration reed 10 may have a tuning fork type, an H type, or the like. In addition, a piezoelectric material of the vibration reed 10 may be a material such as, ceramics other than crystal, or silicon.

Figure 8:
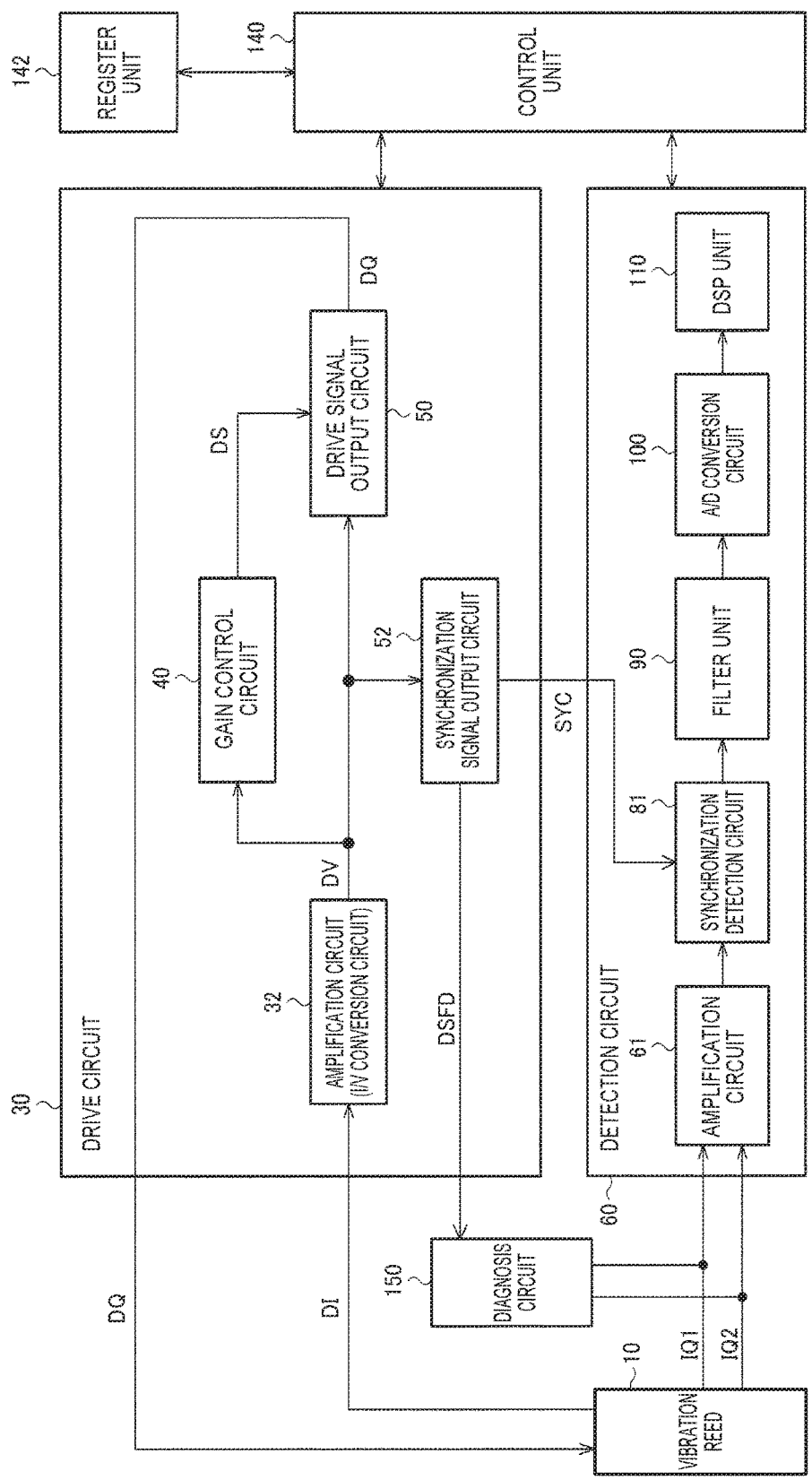
FIG. 8 is a detailed configuration example of a drive circuit and a detection circuit.

FIG. 8 illustrates a detailed configuration example of the drive circuit 30 and the detection circuit 60 of the circuit device.

The drive circuit 30 includes an amplification circuit 32 to which the feedback signal DI from the vibration reed 10 is input, a gain control circuit 40 which performs automatic gain control, and a drive signal output circuit 50 which outputs the drive signal DQ to the vibration reed 10. In addition, the drive circuit 30 includes a synchronization signal output circuit 52 which outputs a synchronization signal SYC to the detection circuit 60. A configuration of the drive circuit 30 is not limited to that in FIG. 8, and various modifications such as, omitting a part of configuration elements thereof or adding other configuration elements thereto can be made.

The amplification circuit 32 (I/V conversion circuit) amplifies the feedback signal DI from the vibration reed 10. For example, the amplification circuit 32 converts the current signal DI from the vibration reed 10 into a voltage signal DV and outputs the voltage signal. The amplification circuit 32 can be configured by an operational amplifier, a feedback resistance element, a feedback capacitor, and the like.

The drive signal output circuit 50 outputs the drive signal DQ, based on the voltage signal DV which is amplified by the amplification circuit 32. For example, in a case where the drive signal output circuit 50 outputs a drive signal of a rectangular wave (or sinusoidal wave), the drive signal output circuit 50 can be configured by a comparator or the like.

The gain control circuit 40 (AGC) controls an amplitude of the drive signal DQ by outputting a control voltage DS to the drive signal output circuit 50. Specifically, the gain control circuit 40 monitors the voltage signal DV and controls gain of an oscillation loop. For example, in order to maintain constant sensitivity of the gyro sensor, the drive circuit 30 needs to maintain constant the amplitude of a drive voltage which is supplied to the vibration reed 10 (vibration reed for drive). Accordingly, the gain control circuit 40 for automatic gain adjustment is provided in the oscillation loop of a drive vibration system. The gain control circuit 40 automatically and variably adjusts the gain such that the amplitude (vibration velocity v of the vibration reed) of the feedback signal DI from the vibration reed 10 is maintained constant. The gain control circuit 40 can be configured by a full wave rectifier which fully rectifies the output signal DV of the amplification circuit 32, an integrator which performs integration processing of an output signal of the full wave rectifier, or the like.

The synchronization signal output circuit 52 receives the signal DV which is amplified by the amplification circuit 32, and outputs the synchronization signal SYC (reference signal) to the detection circuit 60. The synchronization signal output circuit 52 can be configured by a comparator which generates the synchronization signal SYC of a rectangular wave by performing binarization processing of the signal DV of a sinusoidal wave (AC), a phase adjustment circuit (phase shifter) which performs phase adjustment of the synchronization signal SYC, or the like.

In addition, the synchronization signal output circuit 52 outputs a signal DSFD to the diagnosis circuit 150. The signal DSFD has the same phase as the synchronization signal SYC, and, for example, is generated by a comparator which performs binarization processing of the signal DV of a sinusoidal wave, or the like. The synchronization signal SYC itself may be output to the diagnosis circuit 150 as the signal DSFD.

The detection circuit 60 includes the amplification circuit 61, the synchronization detection circuit 81, the filter unit 90, the A/D conversion circuit 100, and the DSP unit 110. The amplification circuit 61 receives the first and second detection signals IQ1 and IQ2 from the vibration reed 10, and performs electric charge-voltage conversion, amplification of differential signals, gain adjustment, or the like. The synchronization detection circuit 81 performs synchronization detection, based on the synchronization signal SYC from the drive circuit 30. The filter unit 90 (low pass filter) functions as a prefilter of the A/D conversion circuit 100. In addition, the filter unit 90 also functions as a circuit which attenuates an undesired signal that is not removed by the synchronization detection. The A/D conversion circuit 100 performs A/D conversion of the signal whose synchronization detection is completed. The DSP unit 110 performs digital signal processing such as, digital filter processing or digital correction processing with respect to a digital signal from the A/D conversion circuit 100.

For example, the detection signals IQ1 and IQ2 which are electric charge signals (current signals) from the vibration reed 10 have phases that are delayed by 90 degrees with respect to the drive signal DQ which is a voltage signal. In addition, a phase is delayed by 90 degrees by a Q/V conversion circuit or the like of the amplification circuit 61. Accordingly, an output signal of the amplification circuit 61 has a phase which is delayed by 180 degrees with respect to the drive signal DQ. Hence, for example, by performing synchronization detection using the synchronization signal SYC having the same phase as the drive signal DQ (DV), it is possible to remove an undesired signal or the like which has a phase delayed by 90 degrees with respect to the drive signal DQ.

The control unit 140 performs control processing of the circuit device 20. The control unit 140 can be configured by a logic circuit (gate array or the like), a processor, or the like. Various types of switch control, mode setting, or the like of the circuit device 20 is performed by the control unit 140.

The register unit 142 has a register to which various types of information are set. The register unit 142 can be configured by a memory such as an SRAM, a flip-flop circuit, or the like. For example, information on the failure determination results of the control unit 140 is stored in the register unit 142. Thus, as an external controller or the like accesses the register unit 142, the information on the failure determination results can be read by the external controller.

FIG. 8 illustrates the configuration example of the digital gyro circuit device which outputs the detected angular velocity as digital data, but the present embodiment is not limited to this, and the present embodiment may have a configuration of an analog gyro circuit device which outputs the detected angular velocity as an analog voltage (DC voltage).

5. Detailed Circuit Configuration Example of Detection Circuit

Figure 9:
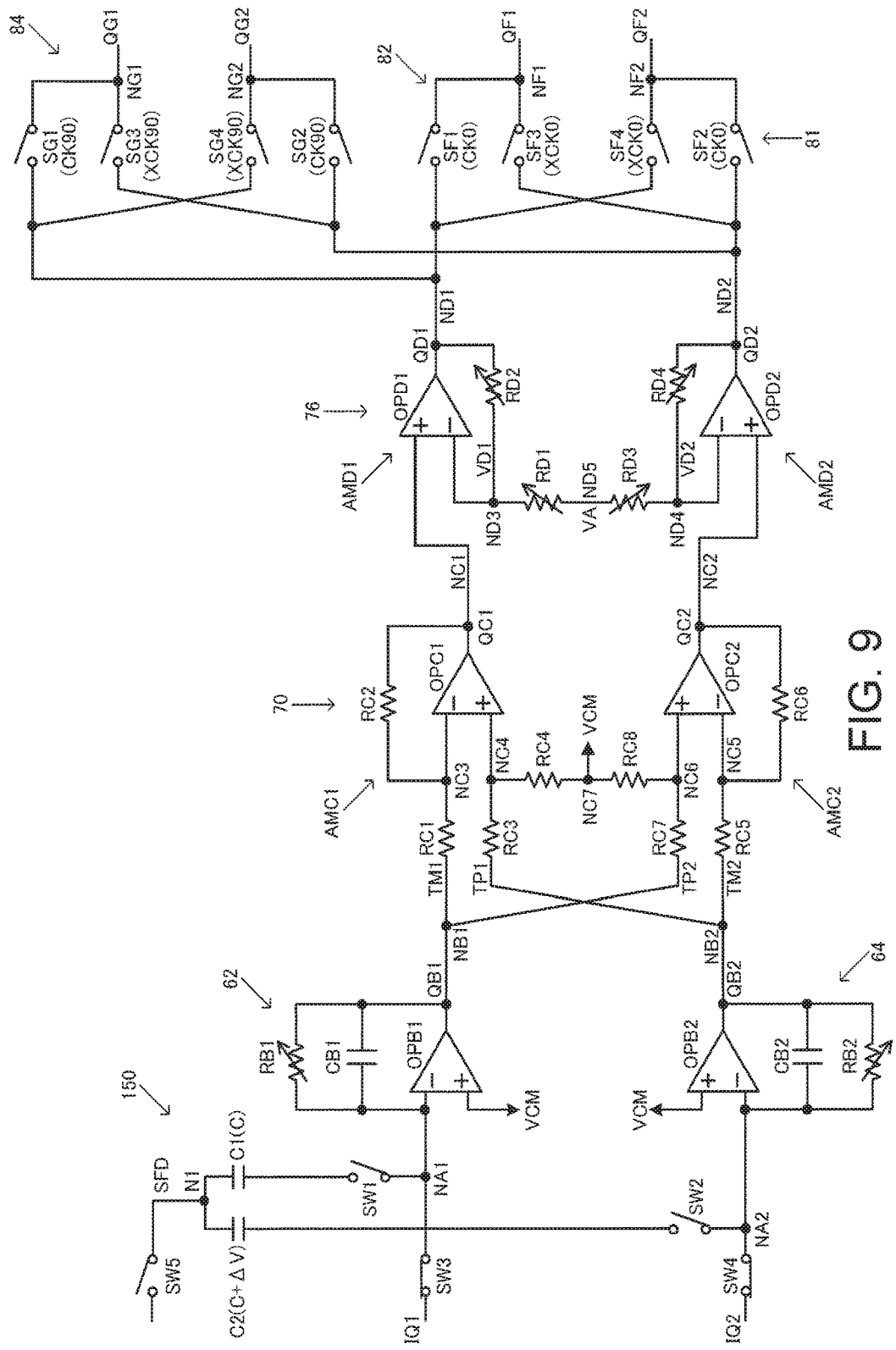
FIG. 9 is a more detailed configuration example of the detection circuit.

FIG. 9 illustrates a more detailed configuration example of the detection circuit 60. The detection circuit 60 is not limited to the configuration of FIG. 9, and various modifications such as, omitting a part of configuration elements thereof or adding other configuration elements thereto can be made.

The diagnosis circuit 150 includes first and second capacitors C1 and C2. The first capacitor C1 is provided between an input node NA1 of a Q/V conversion circuit 62 to which the detection signal IQ1 is input, and a first node N1. The second capacitor C2 is provided between an input node NA2 of a Q/V conversion circuit 64 to which the detection signal IQ2 is input, and the first node N1. The input nodes NA1 and NA2 are nodes on one side of terminals of the first and second capacitors C1 and C2, and the first node N1 is a node on the other side of terminals of the first and second capacitors C1 and C2.

In addition, a capacitance value of the second capacitor C2 is different from a capacitance value of the first capacitor C1. For example, in a case where the capacitance value of the first capacitor C1 is referred to as C, the capacitance value of the second capacitor C2 is C+ΔC. Here, ΔC may be a positive capacitance value, and may be a negative capacitance value. A ratio of ΔC (absolute value of ΔC) with respect to the capacitance value C can be set to, for example, approximately 5% to 30%.

At the time of diagnosis mode (diagnosis period), a diagnosis signal SFD is input to the first node N1. For example, after a current is input, the diagnosis signal SFD is supplied to the first node N1 during a normal operation period, and diagnosis processing (self-diagnosis) of the detection circuit 60 (circuit device) is performed. The diagnosis signal SFD is not supplied from, for example, the outside of the circuit device, and is generated in the inside of the circuit device. For example, as illustrated in FIG. 8, the diagnosis signal SFD is generated based on the signal DSFD from the drive circuit 30. Specifically, the diagnosis signal SFD has the same (including approximately the same) phase as the synchronization signal SYC (reference signal) which is output from the drive circuit 30.

As described above, the diagnosis signal SFD is input to the first node N1 in the diagnosis mode, and thereby the Q/V conversion circuit 62 outputs a signal QB1 with a first voltage amplitude according to a first capacitance ratio between the first capacitor C1 and a feedback capacitor of the Q/V conversion circuit 62. In addition, the Q/V conversion circuit 64 outputs a signal QB2 with a second voltage amplitude according to a second capacitance ratio between the second capacitor C2 and a feedback capacitor of the Q/V conversion circuit 64. Capacitance values of the first and second capacitors C1 and C2 are different from each other, and thus, the first and second capacitance ratios are also different from each other. Accordingly, the first voltage amplitude of the signal QB1 which is output from the Q/V conversion circuit 62 is different from the second voltage amplitude of the signal QB2 which is output from the Q/V conversion circuit 64. Hence, a voltage difference between the first and second voltage amplitudes is differentially amplified by a differential amplification circuit 70 in the rear stage, and thus, it is possible to supply the detection circuit 60 with a desired signal for diagnosis which is a pseudo desired signal in the diagnosis mode. Thus, it is possible to diagnose whether or not the detection circuit 60 performs a normal operation based on the detection results of the detection circuit 60 with respect to the desired signal for diagnosis.

In addition, the diagnosis circuit 150 includes first, second, third, and fourth switch elements SW1, SW2, SW3, and SW4. In addition, the diagnosis circuit 150 includes a fifth switch element SW5 for inputting the diagnosis signal SFD to the first node N1. The first switch element SW1 is provided between one terminal of the first capacitor C1 and the input node NA1. The second switch element SW2 is provided between one terminal of the second capacitor C2 and the input node NA2.

The third switch element SW3 is provided between the terminal PD1 (FIG. 6) of the circuit device and the input node NA1. The fourth switch element SW4 is provided between the terminal PD2 and the input node NA2.

At the time of the diagnosis mode (diagnosis period), the first and second switch elements SW1 and SW2 are turned on, and the third and fourth switch elements SW3 and SW4 are turned off. Accordingly, while the electrical connection to the first and second terminals PD1 and PD2 is cut off by the third and fourth switch elements SW3 and SW4 which are turned off, the desired signal (pseudo desired signal) for diagnosis which uses the diagnosis signal SFD can be supplied to the detection circuit 60 through the first and second switch elements SW1 and SW2 which are turned on.

In addition, during a normal operation period, the first and second switch elements SW1 and SW2 are turned off, and the third and fourth switch elements SW3 and SW4 are turned on. Here, the normal operation period is a period in which the detection circuit 60 performs a detection operation. That is, the normal operation period is a period in which the detection circuit 60 performs detection processing of the desired signal using the detection signals IQ1 and IQ2. By doing so, during the normal operation period, while the electrical connection to the first and second capacitors C1 and C2 is cut off by the first and second switch elements SW1 and SW2 which are turned off, detection processing which uses the first and second detection signals IQ1 and IQ2 can be performed through the third and fourth switch elements SW3 and SW4 which are turned on.

The Q/V conversion circuit 62 includes an operational amplifier OPB1, a feedback capacitor CB1, and a feedback resistance element RB1. A non-inverted input terminal of the operational amplifier OPB1 is set to an analog common voltage VCM. The feedback capacitor CB1 is provided between an output terminal and an inverted input terminal of the operational amplifier OPB1. The feedback resistance element RB1 is also provided between the output terminal and the inverted input terminal of the operational amplifier OPB1. The feedback resistance element RB1 is an element for setting a DC bias point of an output signal of the operational amplifier OPB1, and may have a configuration in which the feedback resistance element RB1 is omitted.

The Q/V conversion circuit 64 includes an operational amplifier OPB2, a feedback capacitor CB2, and a feedback resistance element RB2. A non-inverted input terminal of the operational amplifier OPB2 is set to the analog common voltage VCM. The feedback capacitor CB2 is provided between an output terminal and an inverted input terminal of the operational amplifier OPB2. The feedback resistance element RB2 is also provided between the output terminal and the inverted input terminal of the operational amplifier OPB2. The feedback resistance element RB2 is an element for setting a DC bias point of an output signal of the operational amplifier OPB2, and may have a configuration in which the feedback resistance element RB2 is omitted.

The Q/V conversion circuits 62 and 64 accumulate electric charges of electric charge signals which are the detection signals IQ1 and IQ2 from the vibration reed 10 in the feedback capacitors CB1 and CB2, thereby converting the electric charge signal into a voltage signal. The Q/V conversion circuits 62 and 64 have characteristics of a low pass filter, and, for example, capacitance values or the like of the feedback capacitors CB1 and CB2 are set such that a cut-off frequency thereof is much lower than a drive frequency (resonance frequency) of the physical quantity transducer 18.

The differential amplification circuit 70 includes a first amplifier AMC1 and a second amplifier AMC2. The first amplifier AMC1 is an amplifier with two differential inputs and a single-ended output. The second amplifier AMC2 is also an amplifier with two differential inputs and a single-ended output.

The first amplifier AMC1 includes a first operation amplifier OPC1 and first to fourth resistance elements RC1 to RC4.

The first resistance element RC1 is provided between an inverted input terminal TM1 (node NB1) of the first amplifier AMC1 and an inverted input terminal (node NC3) of the first operation amplifier OPC1. The second resistance element RC2 is provided between the inverted input terminal of the first operation amplifier OPC1 and an output terminal (output terminal of the first amplifier AMC1, Node NC1) of the first operation amplifier OPC1. That is, the first and second resistance elements RC1 and RC2 are connected in series between the inverted input terminal TM1 of the first amplifier AMC1 and the output terminal NC1 of the first operation amplifier OPC1. The signal QB1 from the Q/V conversion circuit 62 in the front stage is input to the inverted input terminal TM1 (−) of the first amplifier AMC1.

The third resistance element RC3 is provided between a non-inverted input terminal TP1 (node NB2) of the first amplifier AMC1 and a non-inverted input terminal (node NC4) of the first operation amplifier OPC1. The fourth resistance element RC4 is provided between the non-inverted input terminal (node NC4) of the first operation amplifier OPC1 and a node NC7 of the analog common voltage VCM. That is, the third and fourth resistance elements RC3 and RC4 are connected in series between the non-inverted input terminal TP1 of the first amplifier AMC1 and the node NC7. The signal QB2 from the Q/V conversion circuit 64 in the front stage is input to the non-inverted input terminal TP1 (+) of the first amplifier AMC1.

The second amplifier AMC2 includes a second operation amplifier OPC2 and fifth to eighth resistance elements RC5 to RC8.

The fifth resistance element RC5 is provided between an inverted input terminal TM2 (node NB2) of the second amplifier AMC2 and an inverted input terminal (node NC5) of the second operation amplifier OPC2. The sixth resistance element RC6 is provided between the inverted input terminal (NC5) of the second operation amplifier OPC2 and an output terminal (output terminal of the second amplifier AMC2, Node NC2) of the second operation amplifier OPC2. That is, the fifth and sixth resistance elements RC5 and RC6 are connected in series between the inverted input terminal TM2 of the second amplifier AMC2 and the output terminal NC2 of the second operation amplifier OPC2. The signal QB2 from the Q/V conversion circuit 64 in the front stage is input to the inverted input terminal TM2 (−) of the second amplifier AMC2.

The seventh resistance element RC7 is provided between a non-inverted input terminal TP2 (node NB1) of the second amplifier AMC2 and a non-inverted input terminal (node NC6) of the second operation amplifier OPC2. The eighth resistance element RC8 is provided between the non-inverted input terminal (node NC6) of the second operation amplifier OPC2 and the node NC7 of the analog common voltage VCM. That is, the seventh and eighth resistance elements RC7 and RC8 are connected in series between the non-inverted input terminal TP2 of the second amplifier AMC2 and the node NC7. The signal QB1 from the Q/V conversion circuit 62 in the front stage is input to the non-inverted input terminal TP2 of the second amplifier AMC2.

As described above, the differential amplification circuit 70 of FIG. 9 is configured by two amplifies which respectively have two differential inputs and a single-ended output. That is, the differential amplification circuit 70 is configured by the first amplifier AMC1 with two differential inputs and a single-ended output in which, among the signals QB1 and QB2 that configure differential signals, the signal QB1 is input to the inverted input terminal TM1 (−) and the signal QB2 is input to the non-inverted input terminal TP1 (+), and the second amplifier AMC2 with two differential inputs and a single-ended output in which the signal QB1 is input to the non-inverted input terminal TP2 (+) and the signal QB2 is input to the inverted input terminal TM2 (−).

By configuring the differential amplification circuit 70 as described above, the differential amplification circuit 70 outputs differential signals QC1 and QC2 whose voltages change to a positive side or a negative side with respect to the analog common voltage VCM (analog ground). For example, in a case where the signal QC1 is a positive voltage with respect to the analog common voltage VCM, the signal QC2 becomes a negative voltage with respect to the analog common voltage VCM. In a case where the signal QC1 is a negative voltage with respect to the analog common voltage VCM, the signal QC2 becomes a positive voltage with respect to the analog common voltage VCM.

For example, if resistance values of the resistance elements RC1, RC3, RC5, and RC7 are referred to as R1, resistance values of the resistance elements RC2, RC4, RC6, and RC8 are referred to as R2, and gain of differential amplification of the differential amplification circuit 70 is referred to as GC, a relationship of GC/2=R2/R1 is satisfied. In addition, in a case where the signals QB1 and QB2 are input to the differential amplification circuit 70, the differential amplification circuit 70 outputs the signals QC1 and QC2 which are represented by the following Equations.

$$QC1=VCM-(GC/2)\times(QB1-QB2)$$

$$QC2=VCM+(GC/2)\times(QB1-QB2)$$

$$QC1-QC2=-GC\times(QB1-QB2)$$

That is, the differential amplification circuit 70 outputs the differential signals QC1 and QC2 in which differential components (QB1-QB2) increase by the gain GC times and whose polarities are inverted with respect to the analog common voltage VCM. The differential amplification circuit 70 may be configured by a fully differential amplifier with differential inputs and differential outputs of a normal type.

In FIG. 9, again adjustment amplifier 76 is provided on a rear stage side of the differential amplification circuit 70. The gain adjustment amplifier 76 receives the differential signals QC1 and QC2, amplifies the differential signals QC1 and QC2 using adjustable gain, and outputs differential signals QD1 and QD2.

The gain adjustment amplifier 76 includes first and second operational amplifiers OPD1 and OPD2, and first to fourth resistance elements RD1 to RD4.

The first operational amplifier OPD1 has a non-inverted input terminal (first input terminal) to which the signal QC1 of the signals QC1 and QC2 (first and second signals) that configure differential signals is input. The second operational amplifier OPD2 has a non-inverted input terminal (first input terminal) to which the signal QC2 of the signals QC1 and QC2 is input.

The first resistance element RD1 is provided between a first node ND5 and an inverted input terminal (second input terminal, node ND3) of the first operational amplifier OPD1. The second resistance element RD2 is provided between the inverted input terminal (node ND3) of the first operational amplifier OPD1 and an output terminal (node ND1) of the first operational amplifier OPD1.

The first and second resistance elements RD1 and RD2 divide a voltage between a voltage VA of the first node ND5 and a voltage (voltage of an output signal QD1) of the output terminal of the first operational amplifier OPD1, and function as a first voltage division circuit which sets the inverted input terminal of the first operational amplifier OPD1 to a voltage VD1 which is obtained by the voltage division.

The third resistance element RD3 is provided between the first node ND5 and the inverted input terminal (second input terminal, node ND4) of the second operational amplifier OPD2. The fourth resistance element RD4 is provided between the inverted input terminal (node ND4) of the second operational amplifier OPD2 and an output terminal (node ND2) of the second operational amplifier OPD2.

The third and fourth resistance elements RD3 and RD4 divide a voltage between the voltage VA of the first node ND5 and a voltage (voltage of an output signal QD2) of the output terminal of the second operational amplifier OPD2, and function as a second voltage division circuit which sets the inverted input terminal of the second operational amplifier OPD2 to a voltage VD2 which is obtained by the voltage division.

As described above, the gain adjustment amplifier 76 is configured by a first amplifier AMD1 which includes the first operational amplifier OPD1 and the first and second resistance elements RD1 and RD2, and a second amplifier AMD2 which includes the second operational amplifier OPD2 and the third and fourth resistance elements RD3 and RD4. In addition, one terminal of the resistance element RD1 of the first amplifier AMD1, and one terminal of the resistance element RD3 of the second amplifier AMD2 are commonly connected to the node ND5. Accordingly, an instrumentation amplifier is configured by the first amplifier AMD1 and the second amplifier AMD2.

In addition, the gain adjustment amplifier 76 receives the differential signals QC1 and QC2, and outputs the differential signals QD1 and QD2 to the nodes ND1 and ND2.

In addition, resistance values of the resistance elements RD1 to RD4 are variable. Accordingly, by adjusting the resistance values of the resistance elements, a gain GD of the gain adjustment amplifier 76 is adjusted. For example, if the resistance values of the resistance elements RD1 and RD3 are referred to as R1, the resistance values of the resistance elements RD2 and RD4 are referred to as R2, and a reference resistance value is referred to as R, the resistance values R1 and R2 for setting the gain GD can be represented by R1=R/GD and R2=R×(1−1/GD). In addition, the signals QC1 and QC2 are input to the differential amplification circuit 70, the differential amplification circuit 70 outputs the signals QD1 and QD2 which are represented by the following equations.

$$QD1=VA+(GD/2)\times(QC1-QC2)$$

$$QD2=VA-(GD/2)\times(QC1-QC2)$$

$$QD1-QD2=GD\times(QC1-QC2)$$

Here, VA is a voltage of the node ND5. VA is a voltage which is obtained by dividing voltages of the signals QD1 and QD2 by the resistance elements RD1 and RD2, and the resistance elements RD3 and RD4, and becomes a midpoint voltage between the voltages of the signals QD1 and QD2. Accordingly, a relationship of VA=(QD1+QD2)/2 is satisfied. In addition, in a case where the signals QC1 and QC2 are differential signals which use the analog common voltage VCM as a reference (central voltage) and a relationship of VCM=(QC1+QC2)/2 is satisfied, a relationship of VA=VCM is satisfied.

By providing a gain adjustment function to the differential amplification circuit 70, or the like, the configuration of the gain adjustment amplifier 76 may be omitted.

In addition, for example, failure detection of the differential amplification circuit 70 can be performed by monitoring the voltages of output signals QC1 and QC2 of the differential amplification circuit 70. For example, by determining whether or not a monitoring voltage (for example, a midpoint voltage between the first voltage and the second voltage) based on the first voltage of the output signal QC1 and the second voltage of the output signal QC2 is within a determination voltage range (range from a low potential side threshold voltage to a high potential side threshold voltage), it is possible to detect independent failure of the differential amplification circuit 70 and to perform normal failure detection.

In addition, failure detection of the gain adjustment amplifier 76 can be performed by monitoring the voltage VA of the node ND5 of the instrumentation amplifier which is configured by, for example, the amplifiers AMD1 and AMD2 as a monitoring voltage. For example, by determining whether or not the monitoring voltage VA is within the determination voltage range, it is possible to detect independent failure of the gain adjustment amplifier 76 and to perform normal failure detection.

The synchronization detection circuit 81 includes the first detection circuit 82 and the second detection circuit 84, and performs differential synchronization detection. A configuration and an operation of the synchronization detection circuit 81 are the same as those described with reference to FIGS. 5A and 5B. For example, the switch elements SD1 to SD4 of FIGS. 5A and 5B correspond to the switch elements SF1 to SF4 of FIG. 9, and the switch elements SD5 to SD8 correspond to the switch elements SG1 to SG4.

For example, a vibration leakage signal is arbitrarily generated in the vibration reed 10, the second detection circuit 84 (switching mixer) detects the vibration leakage signal, and thus, failure diagnosis of the detection circuit 60 is performed.

For example, in FIG. 7, if vibration energy of the drive arms 4 and 5 and vibration energy of the drive arms 6 and 7 are balanced when both the drive arms 4 and 5 and the drive arms 6 and 7 perform flexural vibration, the detection arms 8 and 9 do not perform flexural vibration in a state in which an angular velocity is not applied to the vibration reed 10. Meanwhile, if the vibration energy of the drive arms 4 and 5 and the vibration energy of the drive arms 6 and 7 are unbalanced, the detection arms 8 and 9 perform flexural vibration even in a state in which the angular velocity is not applied to the vibration reed 10. This flexural vibration is called leakage vibration, and is the flexural vibration in a direction of the arrow C in the same manner as vibration based on Coriolis force. The vibration (detection signals IQ1 and IQ2) based on Coriolis force has a phase which is shifted by 90 degrees with respect to the drive signal DQ, but the leakage vibration has the same phase as the drive signal DQ. Since a phase is shifted by 90 degrees in the Q/V conversion circuits 62 and 64, a signal based on the leakage vibration has a phase which is shifted by 90 degrees with respect to the synchronization signal SYC, in a stage of synchronous detection.

In addition, in the present embodiment, vibration leakage components of a desired level are positively generated by slightly unbalancing the vibration energy of the drive arms 4 and 5 and the vibration energy of the drive arms 6 and 7. As a mass difference is made between weight portions of the tips of the drive arms 4 and 5 and weight portions of the tips of the drive arms 6 and 7 due to, for example, laser processing or the like, the vibration energy is unbalanced, and arbitrary vibration leakage is generated. A level of the vibration leakage has a known value. Accordingly, by detecting a signal of the vibration leakage using the second detection circuit 84, it is possible to perform failure diagnosis of the detection circuit 60.

In the first detection circuit 82, the signal QD1 from the gain adjustment amplifier 76 in the front stage is input to the first input node ND1, and the signal QD2 is input to the second input node ND2. In addition, differential synchronization detection is performed by the synchronization signal SYC (for example, CK0) from the drive circuit 30, and the differential signals QF1 and QF2 are output to the first and second output nodes NF1 and NF2.

Accordingly, synchronization detection of the differential signals QD1 and QD2 from the gain adjustment amplifier 76 is performed in a state of differential signals, and the signals whose synchronization detection is completed are output as the differential signals QF1 and QF2. Frequency conversion into a high frequency bandwidth of an undesired signal such as noise (1/f noise) which is generated by the circuit (the Q/V conversion circuit, the differential amplification circuit, and the gain adjustment amplifier) in the front stage is performed by the first detection circuit 82. In addition, the undesired signal which is a signal according to Coriolis force is dropped to a DC signal. In addition, the undesired signal such as 1/f noise whose frequency conversion into a high frequency bandwidth is performed by the first detection circuit 82 is removed by the filter unit 90 which is provided in the rear stage. The filter unit 90 is a passive filter which is configured by, for example, passive elements. That is, the filter unit 90 can employ a passive filter which is configured by passive elements such as a resistance element and a capacitor, without using an operational amplifier.

Meanwhile, in the second detection circuit 84 (switching mixer), the signal QD1 from the gain adjustment amplifier 76 in the front stage is input to the first input node ND1, and the signal QD2 is input to the second input node ND2. In addition, the differential signals QG1 and QG2 are output to the first and second output nodes NF1 and NF2.

The vibration leakage signal (undesired signal in a broad sense) which is arbitrarily generated in the vibration reed 10 has a phase different from that of the synchronization signal SYC (desired signal) by 90 degrees. Hence, the second detection circuit 84 performs synchronization detection of the signals QD1 and QD2, based on the second clock signal CK90 having a phase different from that of the first clock signal CK0 which is the synchronization signal SYC by 90 degrees, thereby being able to extract the vibration leakage signal which is arbitrarily mixed in. In such a case, since a level of the vibration leakage signal is known, A/D conversion of the detection results obtained by the second detection circuit 84 is made and the detection results are compared with an expected value. Accordingly, it is possible to detect that the vibration leakage signal which is expected is mixed in the signals QD1 and QD2. In addition, in a case where the vibration leakage signal which is expected is detected, it can be determined that the detection circuit 60 normally operates. Diagnosis processing which uses the second detection circuit 84 is performed during a normal diagnosis period illustrated in FIG. 12.

As described above, a case where the first detection circuit 82 detects the physical quantity signal such as the angular velocity signal and the second detection circuit 84 detects the undesired signal is described as an example, but as illustrated in FIG. 3 or the like, in the present embodiment, the circuits which detect the physical quantity signal and the undesired signal are interchanged by switching of the operation modes.

Figure 10:
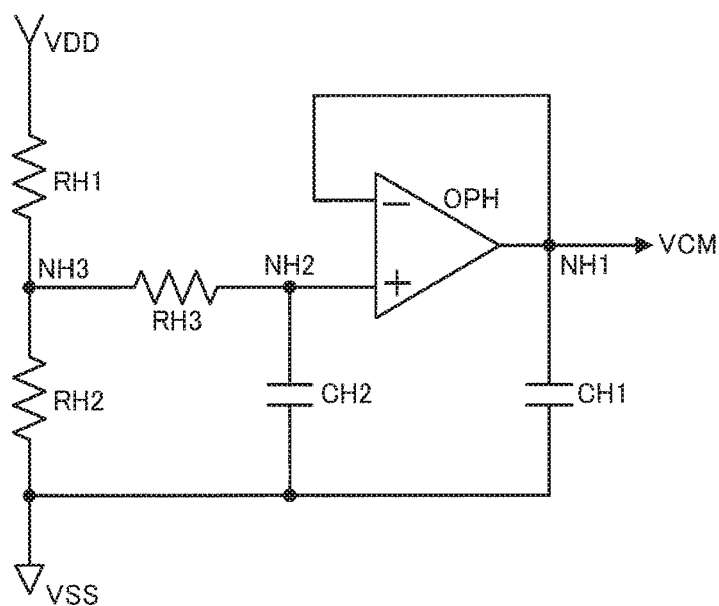
FIG. 10 is a configuration example of an analog common voltage generation circuit.

FIG. 10 is a configuration example of an analog common voltage generation circuit which generates the analog common voltage VCM. The analog common voltage generation circuit includes an operational amplifier OPH, resistance elements RH1, RH2, and RH3, and capacitors CH1 and CH2. The resistance elements RH1 and RH2 are connected in series between power supply voltages VDD and VSS, and generate a divided voltage in a node NH3. The divided voltage is a midpoint voltage between, for example, the power supply voltages VDD and VSS. The divided voltage is supplied to a node NH2 of a non-inverted input terminal of the operational amplifier OPH through a low pass filter for noise reduction which is configured by the resistance element RH3 and the capacitor CH2. The operational amplifier OPH has a so-called voltage follower connection, and outputs a voltage corresponding to the divided voltage to the node NH1 as the analog common voltage VCM. The capacitor CH1 is a capacitor for potential stabilization.

Figure 11:
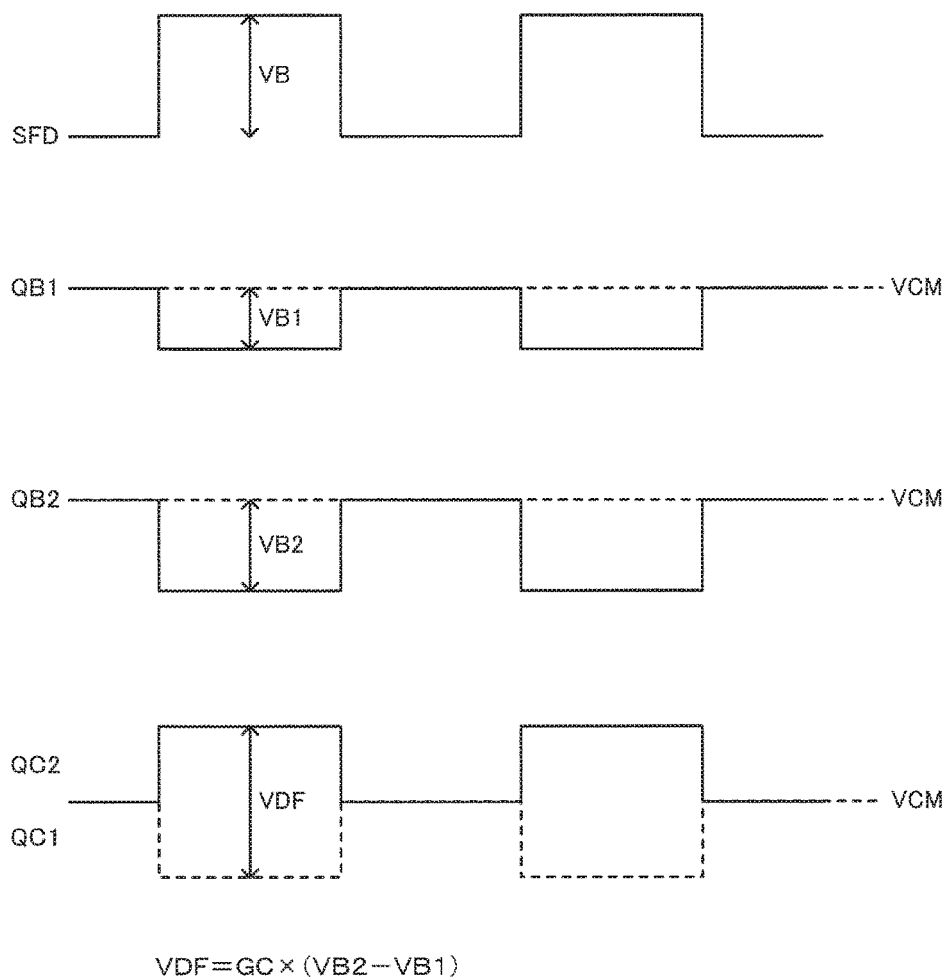
FIG. 11 is a signal waveform diagram illustrating self-diagnosis which is performed by a diagnosis circuit.

FIG. 11 is a signal waveform diagram illustrating self-diagnosis which is performed by the diagnosis circuit 150. In FIG. 11, the diagnosis signal SFD whose voltage amplitude is VB is input to the first node N1 of FIG. 9. Then, the Q/V conversion circuit 62 outputs the signal QB1 whose voltage amplitude is VB1, and the Q/V conversion circuit 64 outputs the signal QB2 whose voltage amplitude is VB2. In FIG. 11, the diagnosis signal SFD has a rectangular wave, but may be a synchronization signal having a sinusoidal wave or the like.

For example, capacitance values of the feedback capacitors CB1 and CB2 are equal to each other, and a capacitance value of the capacitor C2 is greater than a capacitance value of the capacitor C1. The capacitance values of the capacitors CB1 and CB2 are, for example, approximately 0.5 pF to 1.5 pF, and the capacitance value C of the capacitor C1 is, for example, approximately 250 fF to 750 fF. A capacitance value difference ΔC between the capacitors C1 and C2 is, for example, approximately 50 fF to 150 fF. Each of the capacitors C1, C2, CB1, and CB2 can be configured by, for example, a capacitor (poly two-layer capacitor) formed of polysilicon, a capacitor formed of metal-insulator-metal (MIM), or the like.

As described above, in a case where the capacitance value of the capacitor C1 is greater than that of the capacitor C2, the Q/V conversion circuits 62 and 64 output the signals QB1 and QB2 having a relationship of VB1<VB2, as illustrated in FIG. 11. Specifically, the Q/V conversion circuits 62 and 64 are inverting amplifiers. Hence, as illustrated in FIG. 11, in a case where the diagnosis signal SFD is positive, the Q/V conversion circuits 62 and 64 are negative by using the analog common voltage VCM as a reference (center), and output the signals QB1 and QB2 having a voltage amplitude relationship of VB1<VB2.

That is, potentials of the input nodes NA1 and NA2 are both set to the analog common voltage VCM by a virtual ground (virtual short) formed by the operational amplifiers OPB1 and OPB2 of the Q/V conversion circuits 62 and 64. In addition, the capacitance value of the capacitor C2 is greater than that of the capacitor C1, and thus, in a case where the diagnosis signal SFD whose voltage amplitude is VB is applied to the other terminals of the capacitors C1 and C2, the amount of accumulated charges of the capacitor C2 becomes more than that of the capacitor C1. In addition, the capacitance values of the feedback capacitors CB1 and CB2 of the Q/V conversion circuits 62 and 64 are equal to each other, and thus, the signals QB1 and QB2 have a voltage amplitude relationship of VB1<VB2. That is, the voltage amplitude VB1 of the signal QB1 is set to an amplitude corresponding to a capacitance ratio (C1/CB1) between the capacitor C1 and the feedback capacitor CB1, and the voltage amplitude VB2 of the signal QB2 is set to an amplitude corresponding to a capacitance ratio (C2/CB2) between the capacitor C2 and the feedback capacitor CB2. In addition, since the capacitance value of the capacitor C2 is greater than that of the capacitor C1, a relationship of VB1<VB2 is satisfied.

The differential amplification circuit 70 amplifies differential components of the signals QB1 and QB2. Hence, as illustrated in FIG. 11, signals which are obtained by multiplying a difference between the signals QB1 and QB2 by gain and are inverted are output as the differential signals QC1 and QC2. For example, in a case where gain of differential amplification of the differential amplification circuit 70 is referred to as GC, a voltage difference between the signals QC1 and QC2 can be represented by VDF=GC× (VB2−VB1).

As described above, by inputting the diagnosis signal SFD to the node N1 on the other terminal side of the capacitor C1, it is possible to supply the detection circuit 60 with a desired signal (pseudo desired signal) for diagnosis denoted by signals QC1 and QC2. In addition, as the detection circuit 60 performs a detection operation of the desired signal for diagnosis and monitors the detection results, it is possible to diagnose (self-diagnosis, failure diagnosis) whether or not the detection circuit 60 normally operates. Specifically, by detection the differential voltage VDF of the signals QC1 and QC2 of FIG. 11, it is possible to diagnose the detection circuit 60.

For example, capacitance values of the capacitors C1, C2, CB1, and CB2 and a voltage amplitude of the diagnosis signal SFD are known, and thus, the differential voltage VDF between the signals QC1 and QC2 is also known. Hence, if the detection results of the detection circuit 60 corresponding to the differential voltage VDF are within a range of the expected value, it is possible to diagnose that the detection circuit 60 normally operates. Specifically, meanwhile an undesired signal (for example, undesired signal having a phase shifted by 90 degrees) having a phase different from that of the synchronization signal SYC is removed by the synchronization detection of, for example, the synchronization detection circuit 81, a desired signal for diagnosis having the same phase as the synchronization signal SYC is extracted. That is, components of the desired signal for diagnosis appear in a frequency bandwidth such as DC on a frequency spectrum. Hence, if values (DC voltage values or A/D conversion values of DC voltages) of DC components of the desired signal for diagnosis are within a range of the expected value, it is possible to diagnose that the detection circuit 60 normally operates.

FIG. 12 is an operation sequence diagram illustrating the operation of the circuit device according to the present embodiment. As illustrated in FIG. 12, after power is supplied to the circuit device, the circuit device is set to a diagnosis mode, and initial diagnosis is performed. That is, diagnosis for verifying whether or not the detection circuit 60 normally operates is performed. At the time of the initial diagnosis (diagnosis mode), the switch elements SW1 and SW2 of the diagnosis circuit 150 are turned on, and switch elements SW3 and SW4 are turned off. Accordingly, input of the detection signals IQ1 and IQ2 from the vibration reed 10 is electrically blocked, and a signal which is obtained by converting a voltage level of the signal from the drive circuit 30 is input to the node N1 of the other terminals of the capacitors C1 and C2, as the diagnosis signal SFD. Accordingly, as illustrated in FIG. 11, it is possible to diagnose whether or not each circuit of the detection circuit 60 normally operates by supplying the pseudo desired signal for diagnosis to the detection circuit 60.

Meanwhile, if the initial diagnosis is completed and then a normal operation period in which the desired signal is detected starts, the switch elements SW3 and SW4 are turned on, and the switch elements SW1 and SW2 are turned off. Accordingly, the detection signals IQ1 and IQ2 from the vibration reed 10 are input to the detection circuit 60, and detection processing of the desired signal is performed. At this time, the switch elements SW1 and SW2 are turned off, and thus, it is possible to prevent a situation from occurring in which, for example, noise or the like based on a signal from the drive circuit 30 is transferred to the input nodes NA1 and NA2 of the detection circuit 60.

As described above, in FIG. 12, an operation mode is set to the diagnosis mode after the power is supplied and before the normal operation period starts. The setting of the diagnosis mode is performed as, for example, an external controller or the like of the circuit device issues a command for starting the diagnosis mode (initial diagnosis) and the command is received through an interface of the circuit device. Alternatively, the operation mode of the circuit device may be automatically set to the diagnosis mode after the power is supplied. After the normal operation is started, the normal operation is stopped once, and in this state, the diagnosis processing of the circuit device may be performed based on, for example, issuing the command from the external controller of the circuit device, or the like.

In addition, as illustrated in FIG. 12, during the normal operation period, normal diagnosis for normally confirming whether or not the detection circuit 60 performs a normal operation is performed.

In the normal diagnosis, the normal failure detection of the synchronization detection circuit 81 and the filter unit 90 described with reference to FIG. 1 to FIG. 5B is performed. In addition, the normal failure detection of the differential amplification circuit 70 and the gain adjustment amplifier 76 of FIG. 9 is also performed. For example, as the control unit 140 performs setting of the operation mode or the failure determination processing, which is described with reference to FIG. 1 to FIG. 5B, during the normal diagnosis period, the normal failure diagnosis is performed.

As described above, in the present embodiment, while extraction processing of the physical quantity signal (desired signal) performed by the synchronization detection is performed, it is possible to perform the failure diagnosis of the detection circuit 60, and to perform the normal diagnosis during an actual operation of the circuit device. Hence, it is possible to highly increase reliability with respect to failure due to a temporal change and performance degradation.

6. Moving Object and Electronic Apparatus

Figure 13B:
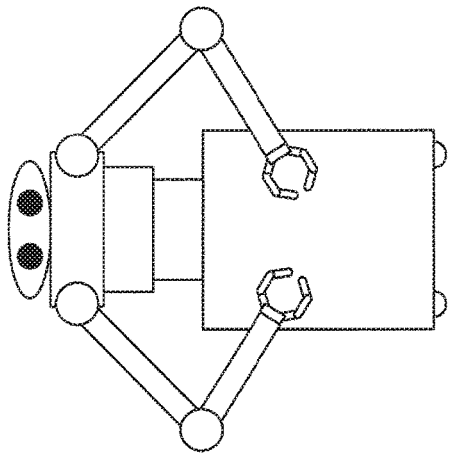
FIGS. 13A to 13D are examples of a moving object and an electronic apparatus in which the circuit device according to the present embodiment is equipped.
Figure 13D:
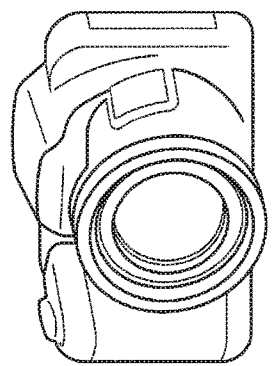
Figure 13A:
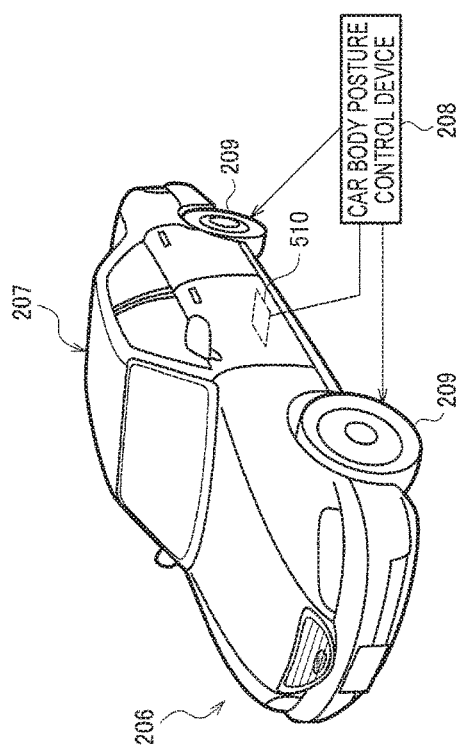

FIG. 13A illustrates an example of a moving object including a circuit device 20 according to the present embodiment. The circuit device 20 according to the present embodiment can be embedded in various moving objects such as, a vehicle, an airplane, a motorcycle, a bicycle, or a ship. The moving object is an apparatus or a device which moves on the ground, sky, or the sea by including, a drive mechanism such as an engine or a motor, a steering mechanism such as a handle or a rudder, or various electronic apparatuses. FIG. 13A schematically illustrates a car 206 as a specific example of the moving object. A gyro sensor 510 (sensor) including the vibration reed 10 and the circuit device 20 is embedded in the car 206. The gyro sensor 510 can detect posture of a car body 207. A detection signal of the gyro sensor 510 is supplied to a car body posture control device 208. The car body posture control device 208 can control hardness or softness of suspension according to, for example, posture of the car body 207, or control a brake of each of car wheels 209. In addition to this, the posture control can be used for various moving objects such as, a bipedal walking robot, an airplane, or a helicopter. The gyro sensor 510 can be used for performing the posture control.

Figure 13C:
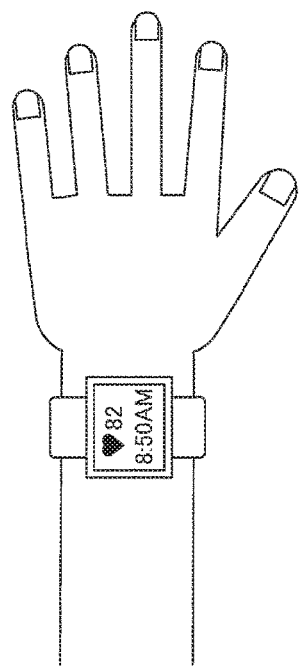

As illustrated in FIGS. 13B and 13C, the circuit device according to the present embodiment can be applied to various electronic apparatuses such as, a digital still camera or a biological information detecting device (a wearable health apparatus; for example, a pulse meter, a pedometer, an activity meter, or the like). For example, the digital still camera can perform camera shake correction or the like by using the gyro sensor or the angular velocity sensor. In addition, the biological information detecting device can detect body motion of a user or detect motion status by using the gyro sensor or the angular velocity sensor. In addition, as illustrated in FIG. 13D, the circuit device according to the present embodiment can also be applied to a movable portion (arm, joint) or a body portion of a robot. The robot may also be any one of a moving object (travelling and walking robot) and an electronic apparatus (non-travelling and non-walking robot). In a case of the travelling and walking robot, the circuit device according to the present embodiment can be used for, for example, autonomous travel.

As described above, the present embodiment is described in detail, but the skilled in the art can easily understand that various modifications can be made without actually departing from a novel technology and effects of the invention. Therefore, the modification examples are all included in a range of the invention. For example, in the specification and drawings, a word (gyro sensor, vibration reed, or the like) which is described at least once together with a different word (physical quantity detection device, physical quantity transducer, or the like) which is broader or the same can be replaced with a word different from that even in any place of the specification or the drawings. In addition, the configuration of the circuit device, the physical quantity detection device, the electronic apparatus, or the moving object, the structure of the vibration reed, or the like is also not limited to the description of the present embodiment, and various modifications can be made.

The entire disclosure of Japanese Patent Application No. 2015-098792, filed May 14, 2015 is expressly incorporated by reference herein.

What is claimed is:

1. A circuit device comprising:
   a synchronization detection circuit which receives an input signal including a physical quantity signal and an undesired signal, performs synchronization detection of the physical quantity signal from the input signal, and outputs the physical quantity signal; and
   a filter unit which is provided on a rear stage side of the synchronization detection circuit,
   wherein the synchronization detection circuit includes
      a first detection circuit which receives the input signal; and
      a second detection circuit which receives the input signal,
   wherein the filter unit includes
      a first filter; and
      a second filter,
   wherein the first detection circuit performs synchronization detection of the physical quantity signal from the input signal based on a first clock signal and outputs the physical quantity signal, wherein the second detection circuit performs synchronization detection of the undesired signal from the input signal based on a second clock signal having a phase different from a phase of the first clock signal and outputs the undesired signal, wherein, in a first mode, the physical quantity signal from the first detection circuit is input to the first filter, and the undesired signal from the second detection circuit is input to the second filter, and wherein, in a second mode, the physical quantity signal from the first detection circuit is input to the first filter and the second filter.

2. The circuit device according to claim 1, further comprising:

a signal selection circuit which is provided between the synchronization detection circuit and the filter unit, wherein, in the first mode, the signal selection circuit outputs the physical quantity signal from the first detection circuit to the first filter and outputs the undesired signal from the second detection circuit to the second filter, and wherein, in the second mode, the signal selection circuit outputs the physical quantity signal from the first detection circuit to the first filter and the second filter.

3. The circuit device according to claim 1, wherein a time period which is configured by a first time period that is set to the first mode and a second time period that is set to the second mode is repeated during a normal diagnosis period after the circuit device starts.

4. The circuit device according to claim 1, wherein, in the first and second modes, the first detection circuit performs synchronization detection of the physical quantity signal from the input signal based on the first clock signal and outputs the physical quantity signal, and the second detection circuit performs synchronization detection of the undesired signal from the input signal based on the second clock signal and outputs the undesired signal, wherein, in third and fourth modes, the first detection circuit performs synchronization detection of the undesired signal from the input signal based on the second clock signal and outputs the undesired signal, and the second detection circuit performs synchronization detection of the physical quantity signal from the input signal based on the first clock signal and outputs the physical quantity signal, wherein, in the third mode, the undesired signal from the first detection circuit is input to the second filter, and the physical quantity signal from the second detection circuit is input to the first filter, and wherein, in the fourth mode, the physical quantity signal from the second detection circuit is input to the first filter and the second filter.

5. The circuit device according to claim 4, further comprising:

a signal selection circuit which is provided between the synchronization detection circuit and the filter unit, wherein, in the first mode, the signal selection circuit outputs the physical quantity signal from the first detection circuit to the first filter and outputs the undesired signal from the second detection circuit to the second filter, wherein, in the second mode, the signal selection circuit outputs the physical quantity signal from the first detection circuit to the first filter and the second filter, wherein, in the third mode, the signal selection circuit outputs the undesired signal from the first detection circuit to the second filter and outputs the physical quantity signal from the second detection circuit to the first filter, and wherein, in the fourth mode, the signal selection circuit outputs the physical quantity signal from the second detection circuit to the first filter and the second filter.

6. The circuit device according to claim 4, wherein the first detection circuit receives a differential input signal which is configured by a positive input signal and a negative input signal as the input signal, and outputs a first differential output signal which is configured by a first positive output signal and a first negative output signal, wherein the second detection circuit receives the differential input signal as the input signal, and outputs a second differential output signal which is configured by a second positive output signal and a second negative output signal, wherein, in the first and second modes, the first detection circuit outputs the physical quantity signal as the first differential output signal, and the second detection circuit outputs the undesired signal as the second differential output signal, and wherein, in the third and fourth modes, the first detection circuit outputs the undesired signal as the first differential output signal, and the second detection circuit outputs the physical quantity signal as the second differential output signal.

7. The circuit device according to claim 6, wherein the first detection circuit includes a first switch element which is provided between a positive input node of the positive input signal that configures the differential input signal and a first positive output node of the first positive output signal that configures the first differential output signal, is turned on or off based on the first clock signal in the first and second modes, and is turned on or off based on the second clock signal in the third and fourth modes;

a second switch element which is provided between a negative input node of the negative input signal that configures the differential input signal and a first negative output node of the first negative output signal that configures the first differential output signal, is turned on or off based on the first clock signal in the first and second modes, and is turned on or off based on the second clock signal in the third and fourth modes;

a third switch element which is provided between the negative input node and the first positive output node, is turned on or off based on a first inverted clock signal that is an inverted signal of the first clock signal in the first and second modes, and is turned on or off based on a second inverted clock signal that is an inverted signal of the second clock signal in the third and fourth modes; and a fourth switch element which is provided between the positive input node and the first negative output node, is turned on or off based on the first inverted clock signal in the first and second modes, and is turned on or off based on the second inverted clock signal in the third and fourth modes, and wherein the second detection circuit includes a fifth switch element which is provided between the positive input node and a second positive output node of the second positive output signal that configures the second differential output signal, is turned on or off based on the second clock signal in the first and second modes, and is turned on or off based on the first clock signal in the third and fourth modes;
a sixth switch element which is provided between the negative input node and a second negative output node of the second negative output signal that configures the second differential output signal, is turned on or off based on the second clock signal in the first and second modes, and is turned on or off based on the first clock signal in the third and fourth modes;
a seventh switch element which is provided between the negative input node and the second positive output node, is turned on or off based on the second inverted clock signal in the first and second modes, and is turned on or off based on the first inverted clock signal in the third and fourth modes; and
an eighth switch element which is provided between the positive input node and the second negative output node, is turned on or off based on the second inverted clock signal in the first and second modes, and is turned on or off based on the first inverted clock signal in the third and fourth modes.

8. The circuit device according to claim 4, wherein a time period which is configured by a first time period that is set to the first mode, a second time period that is set to the second mode, a third time period that is set to the third mode, and a fourth time period that is set to the fourth mode is repeated during a normal diagnosis period after the circuit device starts.

9. The circuit device according to claim 1, further comprising:
an amplification circuit which is provided on a front stage side of the synchronization detection circuit; and
an A/D conversion circuit which is provided on a rear stage side of the synchronization detection circuit.

10. The circuit device according to claim 1, further comprising:
a drive circuit which drives a physical quantity transducer; and
a detection circuit which receives a detection signal according to physical quantity that is output from the physical quantity transducer and includes the synchronization detection circuit.

11. A physical quantity detection device comprising:
the circuit device according to claim 10; and
the physical quantity transducer.

12. An electronic apparatus comprising:
the circuit device according to claim 1.

13. An electronic apparatus comprising:
the circuit device according to claim 2.

14. An electronic apparatus comprising:
the circuit device according to claim 3.

15. An electronic apparatus comprising:
the circuit device according to claim 4.

16. An electronic apparatus comprising:
the circuit device according to claim 5.

17. A moving object comprising:
the circuit device according to claim 1.

18. A moving object comprising:
the circuit device according to claim 2.

19. A moving object comprising:
the circuit device according to claim 3.

20. A moving object comprising:
the circuit device according to claim 4.

* * * * *